(12) United States Patent
Hakusui

(10) Patent No.: US 7,746,848 B2
(45) Date of Patent: Jun. 29, 2010

(54) VIRTUAL PBX BASED ON FEATURE SERVER MODULES

(75) Inventor: Shigeaki Hakusui, Boxford, MA (US)

(73) Assignee: Resource Consortium Limited, Tortola (VG)

( * ) Notice: Subject to any disclaimer, the term of this patent is extended or adjusted under 35 U.S.C. 154(b) by 979 days.

(21) Appl. No.: 11/509,793

(22) Filed: Aug. 24, 2006

(65) Prior Publication Data

US 2007/0047534 A1 Mar. 1, 2007

Related U.S. Application Data

(63) Continuation-in-part of application No. 10/729,871, filed on Dec. 5, 2003, now Pat. No. 7,248,577.

(60) Provisional application No. 60/431,038, filed on Dec. 5, 2002, provisional application No. 60/786,141, filed on Mar. 27, 2006.

(51) Int. Cl.
*H04L 12/66* (2006.01)
(52) U.S. Cl. .................. 370/352; 370/389; 370/401; 379/93.01
(58) Field of Classification Search .......... 370/352, 370/389, 401; 379/93.01
See application file for complete search history.

(56) References Cited

U.S. PATENT DOCUMENTS

| | | | |
|---|---|---|---|
| 4,764,919 | A | 8/1988 | Hunter et al. |
| 6,031,836 | A | 2/2000 | Haserodt |
| 6,393,017 | B1 | 5/2002 | Galvin et al. |
| 6,587,555 | B1 | 7/2003 | Cripe et al. |
| 6,678,359 | B1 | 1/2004 | Gallick |
| 6,775,272 | B2 | 8/2004 | Galvin et al. |
| 2002/0067818 | A1 | 6/2002 | Barathan et al. |
| 2003/0206546 | A1* | 11/2003 | Beyda ............... 370/352 |
| 2004/0052346 | A1 | 3/2004 | Ohta et al. |
| 2004/0192292 | A1 | 9/2004 | Chang et al. |
| 2004/0218583 | A1 | 11/2004 | Adan et al. |

FOREIGN PATENT DOCUMENTS

| | | |
|---|---|---|
| EP | 0696124 | 2/1996 |
| EP | 1235416 | 8/2002 |

(Continued)

OTHER PUBLICATIONS

Huebner, D.L., *Intelligent Telephones and Generic Switching: A Distributed Processing PABX Architecture*, Telecommunication Switching, May 7-11, 1984, International Switching Symposium (ISS), 1984, pp. 1-6.

(Continued)

*Primary Examiner*—Creighton Smith
(74) *Attorney, Agent, or Firm*—Carlineo, Spicer & Kee, LLC

(57) ABSTRACT

A virtual private branch exchange is formed by a plurality of interconnected feature server modules, each having an integral feature server that is configured and operates independently of the other feature server modules. Within a virtual private branch exchange, the feature server modules may be logically arranged in a hierarchy having at least a main feature server module and one or more subordinate feature server modules. A particular feature server module may operate in multiple virtual private branch exchanges, and may have a distinct set of rules for handling calls originating in different virtual private branch exchanges.

20 Claims, 20 Drawing Sheets

FOREIGN PATENT DOCUMENTS

| WO | WO 00/76158 | 12/2000 |
|----|-------------|---------|
| WO | WO 01/31900 | 5/2001 |
| WO | WO 01/60087 | 8/2001 |
| WO | WO 02/058351 | 7/2002 |

OTHER PUBLICATIONS

Foo et al., *A telephone adapter for Internet telephony systems*, Microprocessors and Microsystems 21, 1997, pp. 213-221.

Dianda et al., *Programmable Service Platforms for Converged Voice/Data Services*, Bell Labs Technical Journal, Jul.-Sep. 2000, pp. 43-58.

Supplementary European Search Report (Application No. EP 03 79 9877), European Patent Office, Feb. 16, 2006, 4 pages.

Campbell, B. et al., RFC3428, *Session Initiation Protocol (SIP) Extension for Instant Messaging*, 17 pages, Dec. 2002.

Sparks, R., RFC3420, *Internet Media Type message/sipfrag*, 8 pages, Nov. 2002.

Camarillo, G. et al., RFC3398, *Integrated Services Digital Network (ISDN) User Part (ISUP) to Session Initiation Protocol (SIP) Mapping*, 64 pages, Nov. 2002.

Vemuri, A. et al., RFC3372, *Session Initiation Protocol for Telephones (SIP-T): (SIP-T)*, 22 pages, Sep. 2002.

Schulzrinne, H., RFC3361, *Dynamic Host Configuration Protocol (DHCP-for-IPv4) Option for Session Initiation Protocol (SIP) Servers*, 7 pages, Aug. 2002.

Charlton, N. et al., RFC3351, *User Requirements for the Session Initiation Protocol (SIP) in Support of Deaf, Hard of Hearing and Speech-impaired Individuals*, 16 pages, Aug. 2002.

Jennings, C. et al., RFC3325, *Private Extensions to the Session Initiation Protocol (SIP) for Asserted Identity within Trusted Networks*, 17 pages, Nov. 2002.

Watson, M., RFC3324, *Short Term Requirements for Network Asserted Identity*, 11 pages, Nov. 2002.

Peterson, J., RFC3323, *A Privacy Mechanism for the Session Initiation Protocol (SIP)*, 21 pages, Nov. 2002.

Camarillo, G. et al., RFC3312, *Integration of Resource Management and Session Initiation Protocol (SIP)*, 29 pages, Oct. 2002.

Rosenberg, J., RFC3311, *The Session Initiation Protocol (SIP) Update Method*, 13 pages, Oct. 2002.

Roach, A. B., RFC3265, *Session Initiation Protocol (SIP)-Specific Event Notification*, 36 pages, Jun. 2002.

Rosenberg, J. et al., RFC3264, *An Offer/Answer Model with Session Description Protocol (SDP)*, 24 pages, Jun. 2002.

Schulzrinne, H., RFC3263, *Session Initiation Protocol (SIP): Locating SIP Servers*, 16 pages, Jun. 2002.

Rosenberg, J. et al., RFC3262, *Reliability of Provisional Responses in Session Initiation Protocol (SIP)*, 14 pages, Jun. 2002.

Rosenberg, J. et al., RFC3261, *SIP: Session Initiation Protocol*, 252 pages, Jun. 2002.

Campbell, B. et al., RFC3087, *Control of Service Context using SIP Request-URI*, 37 pages, Apr. 2001.

Lennox, J. et al., RFC3050, *Common Gateway Interface for SIP*, 33 pages, Jan. 2001.

Donovan, S., RFC2976, *The SIP Info Method*, 9 pages, Oct. 2000.

Petrack, S. et al., RFC2848, *The PINT Service Protocol: Extensions to SIP and SDP for IP Access to Telephone Call Services*, 69 pages, Jun. 2000.

Vaha-Sipila, A., RFC2806, *URLs Telephone Calls*, 20 pages, Apr. 2000.

Rosenberg, J. et al., *SIP Traversal through Residential and Enterprise NATs and Firewalls*, Internet Engineering Task Force WG Internet Draft, Mar. 2001, 24 pages.

Caballero-McCann, D., *Deploying Carrier Grade Services with VoIP Technology*, Cisco Systems, Inc., Presentation, Feb. 16, 2000, 12 pages.

Unknown, *IP Telephony Solutions*, Trillium Digital Systems, Inc., 2000, 5 pages.

Thernelius, F. et al., *SIP Firewall Solutions*, SIP Working Group, Internet Draft, Jul. 2000, 24 pages.

Martin, C. et al., *SIP Through NAT Enabled Firewall Call Flows*, Midcom Working Group, Internet Draft, Feb. 2001, 63 pages.

Unknown, *Comparison of H.323 and SIP*, Nov. 2002, 6 pages.

International Searching Authority, PCT International Search Report for International Application No. PCT/US03/389075, Nov. 17, 2004, 6 pages.

EPO, European Office Action dated Dec. 27, 2007 for Application No. 03 799 877.0-2414.

Dr. Georg Siegert, Amendment under EPC Rule 137 dated Jul. 24, 2008 for EP Application No. 03 799 877.0-2414.

U.S. Appl. No. 11/467,026, filed Aug. 24, 2006, Virtual PBX Based on SIP and Feature Servers, Hakusui.

Notice of Reasons for Rejection in a related Japanese Patent Application No. 2004-559437, mailed Jan. 21, 2009; 5 pages.

\* cited by examiner

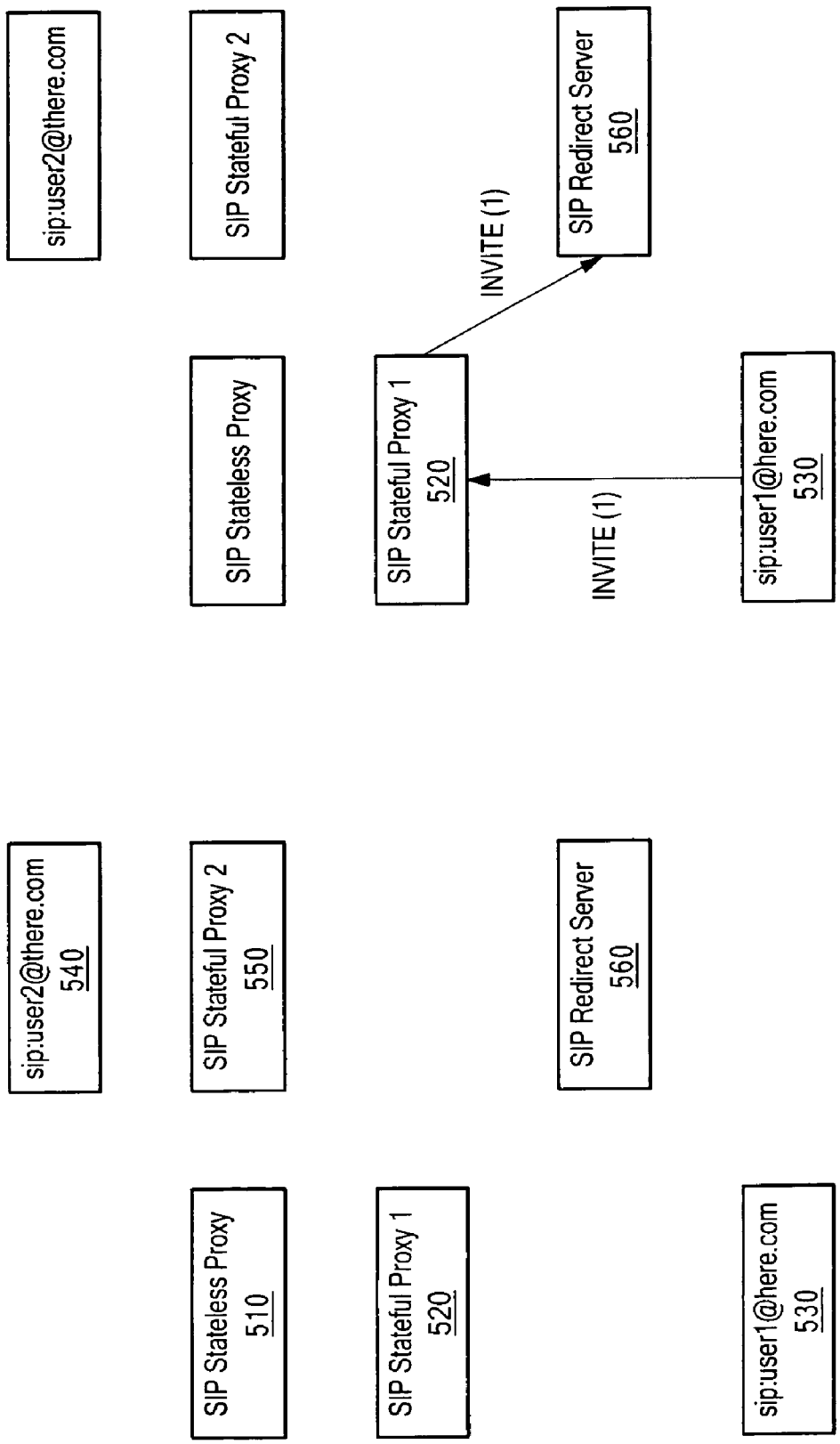

VIRTUAL PBX BASED ON FEATURE SERVER MODULES

PRIORITY

This patent application is a continuation-in-part of U.S. patent application Ser. No. 10/729,871 entitled VIRTUAL PBX BASED ON SIP AND FEATURE SERVERS filed on Dec. 5, 2003 now U.S. Pat. No. 7,243,577 in the name of Shigeaki Hakusui, which claims priority from U.S. Provisional Patent Application Ser. No. 60/431,038 entitled VIRTUAL PBX BASED ON SIP AND FEATURE SERVERS filed Dec. 5,2002 in the name of Shigeaki Hakusui. This patent application also claims priority from U.S. Provisional Patent Application Ser. No. 60/786,141 entitled VIRTUAL PBX BASED ON FEATURE SERVER MODULES filed on Mar. 27, 2006 in the name of Shigeaki Hakusui. The above-referenced patent applications are hereby incorporated herein by reference in their entireties.

FIELD OF THE INVENTION

The present invention relates generally to telephonic communications, and more particularly to a virtual PBX (Private Branch Exchange) based on feature server modules in a Voice-over-IP (VoIP) system.

BACKGROUND OF THE INVENTION

A Private Branch Exchange (PBX) is a subscriber-owned telecommunications exchange that usually includes access to the public switched telephone network (PSTN). The PBX can typically provide various advanced telephone services, such as call hold, call transfer, call forwarding, and conferencing, to name but a few. PBX systems are generally costly, both for setup/maintenance and on a per-extension basis.

A Voice-over-IP (VoIP) system is a telephonic communication system in which telephonic communications are carried over a communication network, such as the Internet or a private intranet, using the Internet Protocol (IP). One advantage of a VoIP system is that long distance phone charges can be substantially eliminated, since long-distance voice traffic can be carried over the Internet essentially for free. A PBX system can be used in conjunction with a VoIP system, in which case the PBX handles telephonic communications within the subscriber network and any voice traffic needing to go outside of the subscriber network can be carried over the VoIP system.

Some broadband (BB) phone services utilize the Media Gateway Control Protocol (MGCP). It is a simple solution and fits very well into the single home residential market with an ADSL connection, while requiring a GIP (Global Internet Protocol) address at the client. However, the MGCP-based BB-phone faces a formidable challenge with Multi-dwelling Units (MDU), apartments/ condominiums and business applications. It is difficult to obtain accessibility from the Internet to the GIP inside the LAN.

Another protocol that is often used for VoIP is the Session Initiated Protocol (SIP). SIP is well-known in the Internet community, and is described in the following Internet Engineering Task Force (IETF) Request For Comments (RFC) documents, all of which are hereby incorporated herein by reference in their entireties:

RFC3428, Session Initiation Protocol (SIP) Extension for Instant Messaging, B. Campbell, Ed., J. Rosenberg, H. Schulzrinne, C. Huitema, D. Gurle, December 2002;

RFC3420, Internet Media Type message/sipfrag, R. Sparks, November 2002;

RFC3398, Integrated Services Digital Network (ISDN) User Part (ISUP) to Session Initiation Protocol (SIP) Mapping, G. Camarillo, A. B. Roach, J. Peterson, L. Ong, November 2002;

RFC3372 (BCP0063), Session Initiation Protocol for Telephones (SIP-T): (SIP-T), A. Vemuri, J. Peterson, September 2002;

RFC3361, Dynamic Host Configuration Protocol (DHCP-for-IPv4) Option for Session Initiation Protocol (SIP) Servers, H. Schulzrinne, August 2002;

RFC3351, User Requirements for the Session Initiation Protocol (SIP) in Support of Deaf, Hard of Hearing and Speech-impaired Individuals, N. Charlton, M. Gasson, G. Gybels, M. Spanner, A. van Wijk, August 2002;

RFC3325, Private Extensions to the Session Initiation Protocol (SIP) for Asserted Identity within Trusted Networks, C. Jennings, J. Peterson, M. Watson, November 2002;

RFC3324, Short Term Requirements for Network Asserted Identity, M. Watson, November 2002;

RFC3323, A Privacy Mechanism for the Session Initiation Protocol (SIP), J. Peterson, November 2002;

RFC3312, Integration of Resource Management and Session Initiation Protocol (SIP), G. Camarillo, Ed., W. Marshall, Ed., J. Rosenberg, October 2002;

RFC3311, The Session Initiation Protocol (SIP) UPDATE Method, J. Rosenberg, October 2002;

RFC3265, Session Initiation Protocol (SIP)-Specific Event Notification, A. B. Roach, June 2002;

RFC3264, An Offer/Answer Model with Session Description Protocol (SDP), J. Rosenberg, H. Schulzrinne, June 2002;

RFC3263, Session Initiation Protocol (SIP): Locating SIP Servers, J. Rosenberg, H. Schulzrinne, June 2002;

RFC3262, Reliability of Provisional Responses in Session Initiation Protocol (SIP), J. Rosenberg, H. Schulzrinne, June 2002;

RFC3261, SIP: Session Initiation Protocol, J. Rosenberg, H. Schulzrinne, G. Camarillo, A. Johnston, J. Peterson, R. Sparks, M. Handley, E. Schooler, June 2002;

RFC3087, Control of Service Context using SIP Request-URI, B. Campbell, R. Sparks, April 2001;

RFC3050, Common Gateway Interface for SIP, J. Lennox, H. Schulzrinne, J. Rosenberg, January 2001;

RFC2976, The SIP INFO Method, S. Donovan, October 2000;

RFC2848, The PINT Service Protocol: Extensions to SIP and SDP for IP Access to Telephone Call Services, S. Petrack, L. Conroy, June 2000; and RFC2806, URLs for Telephone Calls, A. Vaha-Sipila, April 2000.

Generally speaking, SIP uses proxy servers that reside outside of the subscriber network (i.e., coupled to the Internet) to enable telephonic communications to and from telephones within the subscriber network. Specifically, the subscriber network typically includes a router that interfaces the subscriber network to the Internet. The router typically acts as a firewall to prevent unauthorized access to the subscriber network from the Internet. The router is configured to recognize a SIP proxy server so that traffic from the SIP proxy server is allowed through to the subscriber network. VoIP connections can be made to and from the SIP phone through the SIP proxy server.

In order for a subscriber telephone to communicate over the VoIP system, the telephone must be coupled to the router. A traditional analog telephone can connect to the router through a VoIP modem, which includes a standard telephone connection into which the telephone is connected and a LAN (Local Area Network) connector (e.g., Ethernet) for communicating with the router over a LAN, and which performs the necessary analog-to-digital and digital-to-analog conversions (and other functions, such as forming packets including digitized voice data) to enable communications over the VoIP system. VoIP phones may include the necessary conversion logic and LAN connector for operating in the VoIP system. For convenience, the term "SIP phone" may be used hereinafter to refer to a VoIP phone or phone/modem combination that can communicate over the VoIP system.

One advantage of SIP is that each SIP phone is not required to have a global IP (GIP) address. Rather, a Distributed Host Configuration Protocol (DHCP) server dynamically assigns IP addresses to the SIP phones in the subscriber network, and a Network Address Translator (NAT) performs IP address translations between a GIP address associated with the router and the IP addresses assigned to the individual SIP phones. The router can act as the DHCP server and/or the NAT.

SIP adds a little more complexity to the system, as it is able to penetrate router/NAT and firewalls. Among other things, this allows the BB-SIP-Phone to work with a PBX from the existing LAN/ Internet infrastructure in place.

An example of how a telephone connection may be established in an SIP-based VoIP system is described with reference to FIGS. 1A-1H. FIG. 1A shows the various elements in the system, including SIP phones 530 and 540, SIP stateful proxy servers 520 and 550, an SIP stateless proxy server 510, and an SIP redirect server 560. In FIG. 1B, the SIP phone 530 sends an invite to SIP proxy server 520, which in turn sends an invite to SIP redirect server 560. In FIG. 1C, SIP redirect server 560 indicates to SIP proxy server 520 that it has moved temporarily. In FIG. 1D, SIP proxy server 530 sends an acknowledgement (ACK) to SIP redirect server 560 and sends a second invite to SIP proxy server 510. In FIG. 1E, SIP proxy server 510 sends an invite to SIP proxy server 550, which in turn sends an invite to SIP phone 540. In FIG. 1F, SIP phone 540 sends an OK to SIP proxy server 550, which in turn sends an OK to SIP proxy server 510, which in turn sends an OK to SIP proxy server 520, which in turn sends an OK to SIP phone 530. In FIG. 1G, SIP phone 530 sends an ACK to SIP proxy server 520, which in turn sends an ACK to SIP proxy server 550, which in turn sends an ACK to SIP phone 540. In FIG. 1H, the final in-call signaling path between SIP phone 530 and SIP phone 540 goes through SIP proxy server 520 and SIP proxy server 550.

SUMMARY OF THE INVENTION

In embodiments of the present invention, a virtual private branch exchange is formed by a plurality of interconnected feature server modules, each having an integral feature server that is configured and operates independently of the other feature server modules. Within a virtual private branch exchange, the feature server modules may be logically arranged in a hierarchy having at least a main feature server module and one or more subordinate feature server modules. A particular feature server module may operate in multiple virtual private branch exchanges, and may have a distinct set of rules for handling calls originating in different virtual private branch exchanges.

Thus, in accordance with one aspect of the invention there is provided an internet telephony system comprising a plurality of feature server modules operably coupled to form at least one virtual private branch exchange, wherein each feature server module includes an integral internet telephony feature server that is configured and operates independently of the other feature server modules for at least one of receiving and forwarding internet telephone calls.

At least one virtual private branch exchange may include a plurality of feature server modules logically interconnected in a hierarchy having at least two tiers. Telephone calls may be forwarded strictly according to the hierarchy and/or may be forwarded among peer feature server modules at a particular tier of the hierarchy. The hierarchy may include a main feature server module and at least one subordinate feature server module, and may additionally include at least one intermediate feature server module operating between the main feature server module and the at least one subordinate feature server module. The main feature server module may be configurable to direct telephone calls to the at least one subordinate feature server module, and each subordinate feature server module may be separately configurable to handle telephone calls forwarded to it by the main feature server module.

A plurality of feature server modules may be logically divided into a plurality of virtual private branch exchanges, and at least one feature server module may be operably coupled for operation in the plurality of virtual private branch exchanges. Each virtual private branch exchange may include a main feature server module and at least one subordinate feature server module. The main feature server modules may be configured to forward calls to the at least one feature server module operably coupled for operation in the plurality of virtual private branch exchanges. Alternatively, or additionally, at least one subordinate feature server module in one virtual private branch exchange is configured to forward calls to a feature server module in another virtual private branch exchange.

At least one feature server module operably coupled for operation in the plurality of virtual private branch exchanges may include a distinct set of rules for handling calls originating from each virtual private branch exchange. The main feature server modules may forward telephone calls along with an indication of the originating virtual private branch exchange. Each subsequent feature server module may forward the telephone call along with the indication.

In accordance with another aspect of the invention there is provided an internet telephony apparatus comprising a network interface for receiving internet telephone calls originating from a plurality of virtual private branch exchanges; a memory for storing rules for handling the internet telephone calls, the memory including storage for a distinct set of rules for each virtual private branch exchange; and a feature server operably coupled to the network interface and the memory for handling each internet telephone call according to the set of rules associated with the originating virtual private branch exchange.

In such an apparatus, the telephone calls may be received along with an indication of the originating virtual private branch exchange, and the feature server may retrieve the set of rules associated with the originating virtual private branch exchange from the memory based on the indication. The feature server may include a web interface through which the sets of rules can be configured. The apparatus may include a telephone interface into which a standard analog telephone can be connected, and may also include at least one of a microphone and a speaker.

In accordance with another aspect of the invention there is provided a method for handling internet telephone calls originating from a plurality of virtual private branch exchanges. The method involves maintaining a plurality of rule sets, each rule set associated with a different virtual private branch exchange; receiving an internet telephone call; determining an originating virtual private branch exchange for the telephone call; and processing the telephone call according to the rule set associated with the originating virtual private branch exchange.

In such a method, the telephone call may be received along with an indication of the originating virtual private branch exchange, and the originating virtual private branch exchange may be determined by the indication.

BRIEF DESCRIPTION OF THE DRAWINGS

In the accompanying drawings:

FIGS. 1A-1H provide an example of how a telephone connection may be established in an SIP-based VoIP system as known in the art;

DETAILED DESCRIPTION OF A PREFERRED EMBODIMENT

Figure 1D:
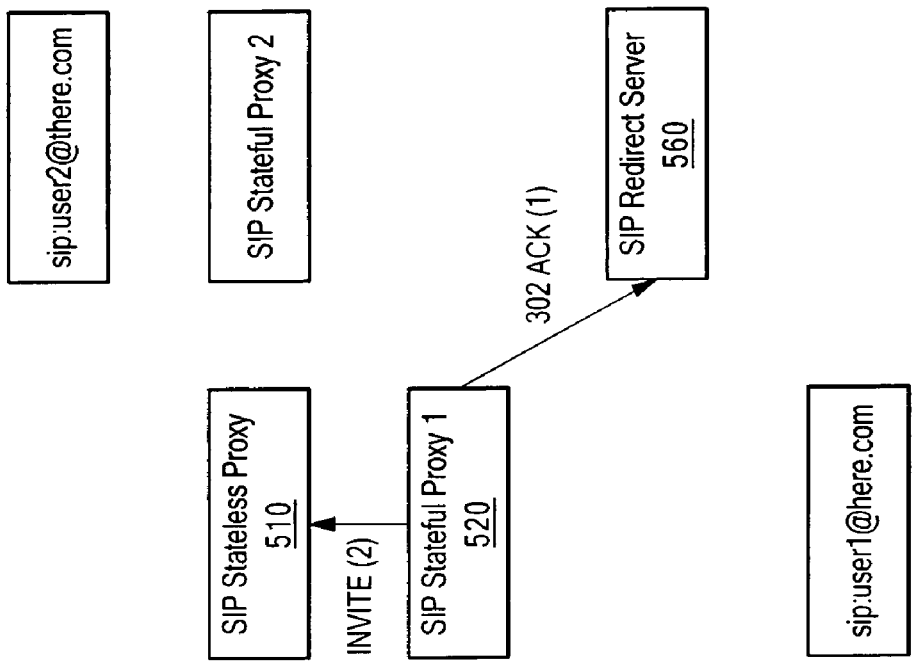
Figure 1C:
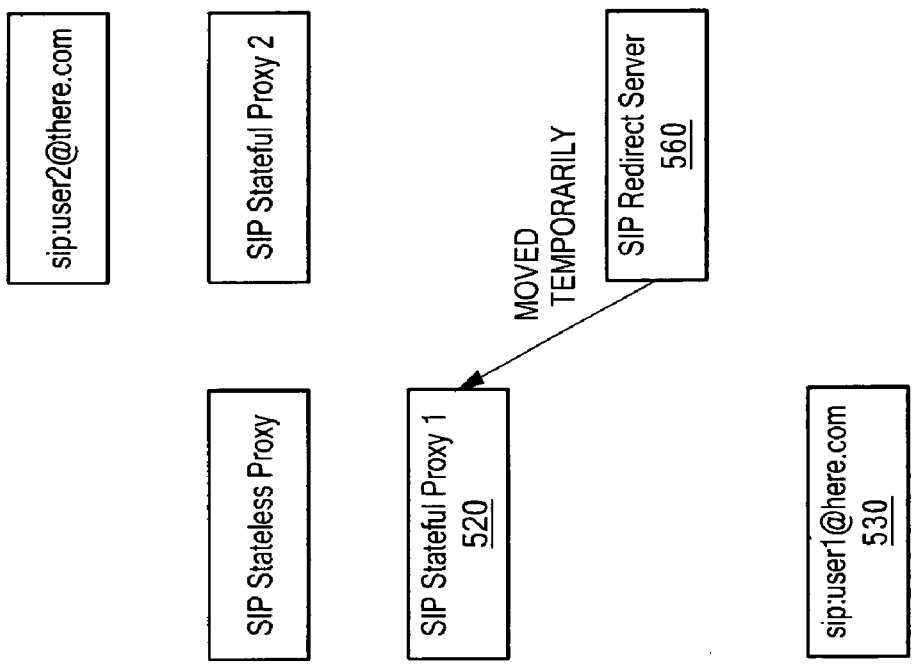
Figures 1E, 1F:
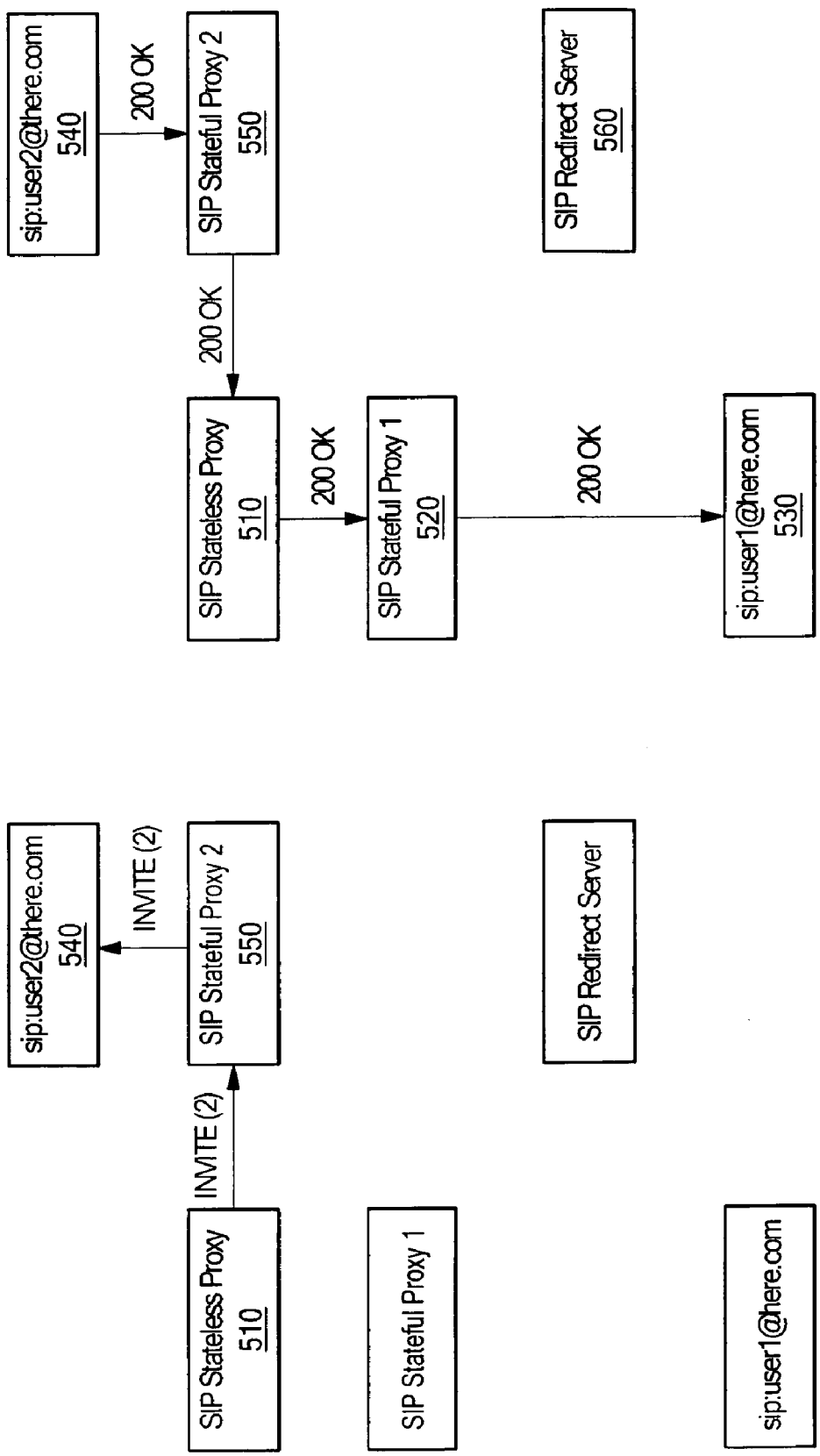
Figure 1H:
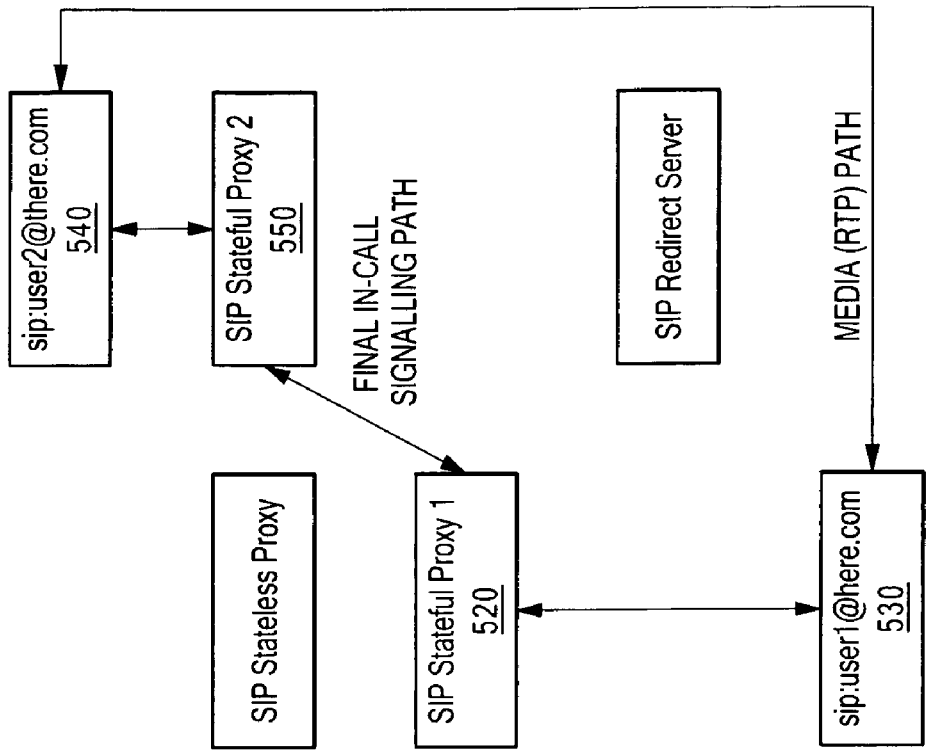
Figure 1G:
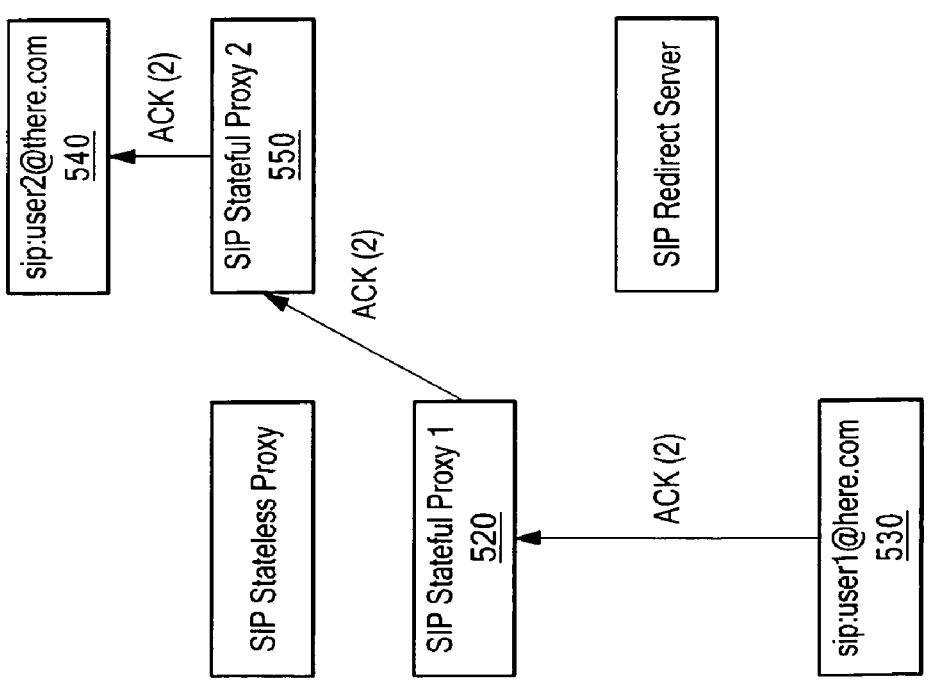

In embodiments of the present invention, a plurality of feature server modules interoperate to provide advanced telephone services in a VoIP system. The feature server modules can provide many, if not all, PBX functions, as well as more advanced functions. Some exemplary feature server functions are described below.

Each feature server typically manages telephone services for an individual telephone number, and each feature server can operate as a stand-alone element that is not necessarily limited to use with a central PBX (e.g., IP-Centrex). Each subscriber can have a personal feature server that can be configured and managed by the subscriber and that operates independently of other feature servers. In this respect, the feature servers are modular in that there is no central management of the feature servers and feature servers can be easily added and removed from the network. A network of such modular feature servers essentially operates as a virtual PBX (VPBX), enabling each subscriber to determine how telephone calls are handled independently of the other feature servers in the network. The virtual PBX can therefore essentially obsolete the PBX.

The feature server(s) can be considered part of the VoIP system in that they typically utilize IP to communicate. The feature server(s) can reside within the subscriber network and/or outside the subscriber network (e.g., in the Internet). The feature server(s) can be stand-alone servers or can be multi-functional servers (e.g., an SIP proxy server or SIP redirect server can act as a feature server).

Some exemplary telephone services that can be provided by the feature server(s) include:

Central number and hunting assignment.
Call holding.
Call transfer.
Simultaneous ring.
Interrupt.
Conference call.

A central number service is one in which a subscriber is associated with a central telephone number, and the central telephone number in turn is associated with one or more extension telephone numbers (e.g., home phone number, work phone number, cell phone number, alternate phone number, secretary or answering service phone number, etc.). When the feature server receives a call to the central telephone number, the feature server causes one or more of the extension telephone numbers to be called. The subscriber may specify that multiple extension telephone numbers be called simultaneously (sometimes referred to as "simultaneous ring"). The subscriber may specify multiple extension telephone numbers to be called in a predetermined sequence (sometimes referred to as "hunting"). The subscriber may specify extension telephone numbers to be called during certain times of the day (e.g., during business or non-business hours) or after no response to an earlier called extension telephone number.

A call holding service is one in which the subscriber can cause a telephone call to be placed on hold. Where the SIP phone is a traditional analog telephone, the subscriber would typically dial a predetermined command (e.g., "*H") on the telephone keypad. Upon receiving the command, the feature server places the call on hold. The subscriber may then be permitted to dial or receive another call.

A call transfer service is one in which the subscriber can cause a telephone call to be transferred. Where the SIP phone is a traditional analog telephone, the subscriber would typically dial a predetermined command (e.g., "*T") followed by the number to which the call is to be transferred. Upon receiving the command, the feature server transfers the call to the specified number.

A simultaneous ring service is one in which multiple extension telephone numbers are rung essentially at the same time when a call is received for a predetermined telephone number. An example of this was described above with reference to central telephone number. However, the simultaneous ring service can be provided for any phone number. For example, the subscriber can provide alternate telephone numbers to be called when a home phone number or direct business phone number is called.

An interrupt service is one in which an outside party is permitted to interrupt an ongoing telephone call to a subscriber. This can be handled in a number of ways. For example, the call may be placed on hold and the outside party patched into the subscriber so that the subscriber and the outside party can communicate exclusively, the outside party may be conferenced in so that all three parties can communicate, or the outside party may be permitted to speak one-way to the subscriber (e.g., whisper). The interrupt service can be controlled by the subscriber using commands entered through the keypad.

A conference call service is one in which multiple parties (typically more than two, although two parties can also be considered to be a conference) are connected.

Figure 2:
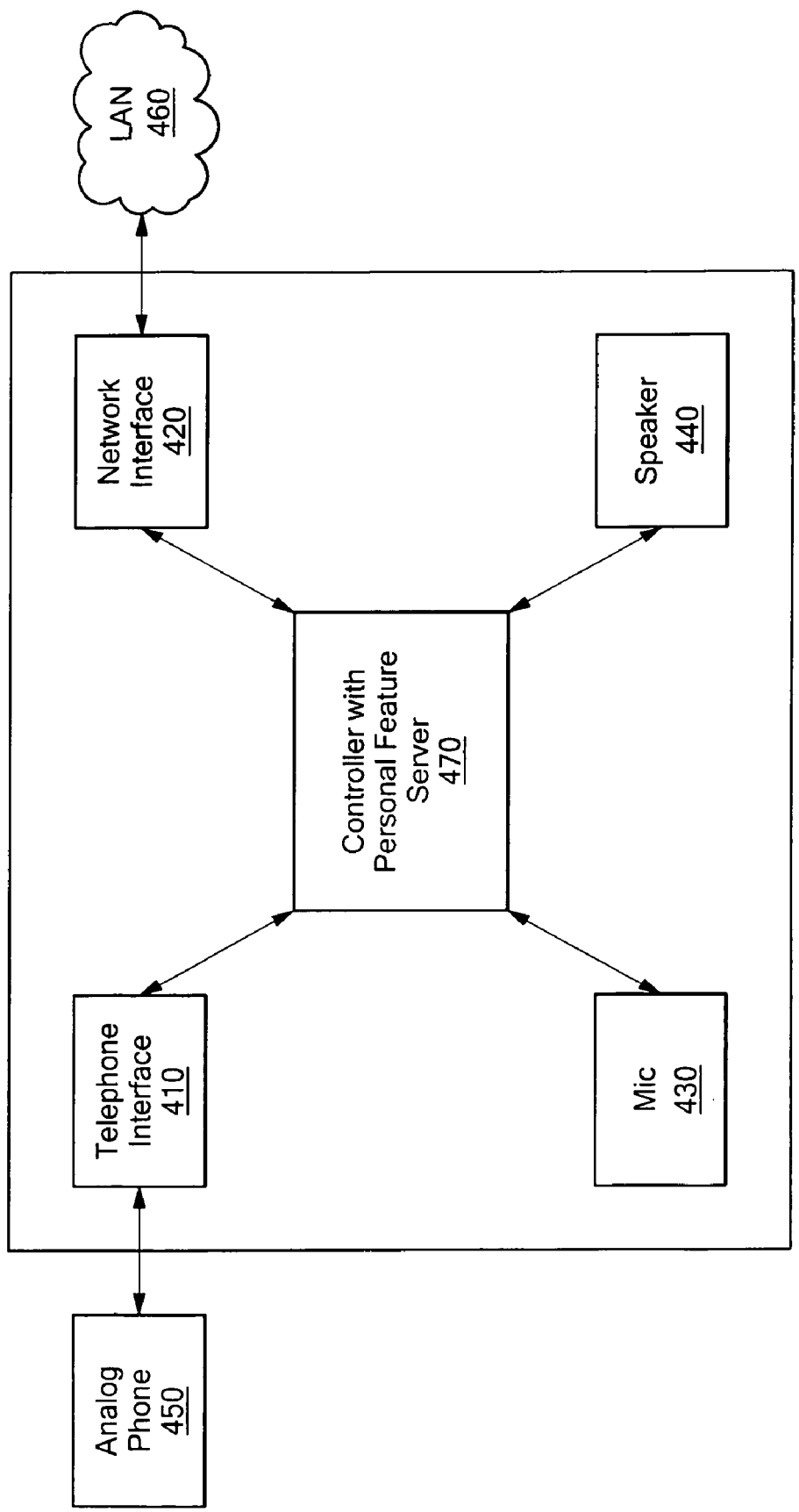
FIG. 2 shows an exemplary VoIP modem in accordance with an embodiment of the present invention.

Other types of functions can also be provided by the feature server(s), for example, using commands entered by the subscriber using the keypad. For example, the feature server(s) can provide such functions as mute, last number redial, flash, voice mail, FIG. 2 shows an exemplary VoIP modem 400 in accordance with an embodiment of the present invention. Among other things, the VoIP modem 400 includes a telephone interface 410 into which a standard analog telephone 450 can be connected and a network interface 420 (such as an Ethernet interface) for connecting to a communication network, such as a LAN (local area network) 460. The VoIP modem 400 may also include a microphone 430 and/or speaker 440. The microphone 430 and speaker 440 can be used to provide speakerphone-type services. The VoIP modem 400 includes a controller 470 implementing, among other things, a personal feature server for managing telephone calls received over the network interface 420 and interacting with the analog telephone 450 connected to the POTS interface 410.

The VoIP modem 400 has a number of advantages over a traditional PBX. One advantage of the VoIP modem 400 over a traditional PBX is that the VoIP modem 400 allows inexpensive consumer telephones to be used, whereas the PBX typically requires the use of more expensive business telephones that are designed for the specific PBX. Another advantage of the VoIP modem 400 over a traditional PBX is that the personal feature server can be managed by the user so that changes can be made quickly and easily, whereas the PBX is typically controlled and managed by a single person or group (e.g., an Information Technology group of a company) and so changes must be coordinated through that person or group. Yet another advantage of the VoIP modem 400 over a traditional PBX is that the VoIP modem 400 is portable, so the user can connect the modem the network wherever it is convenient and telephone calls will reach the modem using regular IP mechanisms. Thus, for example, telephone calls from a work extension can continue to be forwarded to the user when the user is away from the office or even after the user has left the company, provided the company's feature server is configured to forward calls for that user's extension to the user's modem. Also, the user can be easily moved from one office to another office while maintaining the same extension by simply moving the modem 400, whereas the PBX must typically be reconfigured when a user moves from one office to another office in order for the user to keep the same extension.

When a telephone call is received over the network interface 420, the controller 470 can be configured to ring the telephone 450 via the telephone interface 410, simultaneously ring the telephone 450 via the telephone interface 410 and one or more other phone numbers via the network interface 420, or immediately forward the call to another telephone via the network interface 420, among other things. If the telephone 450 is rung and is not answered within a predetermined amount of time (or number of rings), then the controller 470 can be configured to forward the call to another telephone via the network interface 420. When forwarding a call, the controller 470 can be configured to simultaneously ring one or more other phones via the network interface 420. The controller 470 can be configured with a "chain" of telephone numbers to forward and/or simultaneously ring. Also, when a call is received over the network interface 420 and analog phone 450 is already in use, the controller 470 can be configured to automatically forward the call, generate a call waiting signal to the phone 450, interrupt the phone 450, or permit one-way communication from the new caller to the phone 450 (i.e., whisper), among other things. The controller 470 can receive signals from the phone 450 and perform various advanced telephone functions (e.g., "*F" or "flash" to switch between two or more calls, "*H" to put a call on hold, "*M" to mute the phone, "*S" for speakerphone, "*C" for conference calling, "*X" to transfer a call, "*V" to change handset volume, etc.).

In exemplary embodiments of the invention, the personal feature server includes a web-based interface that is configurable through the network interface 420. Thus, when the modem 400 is connected to the network 460, it is easy for the user to manage and configure the personal feature server using a traditional web browser. Security mechanisms are preferably provided by the personal feature server so that only the user or other authorized persons can access the personal feature server.

Figure 3:
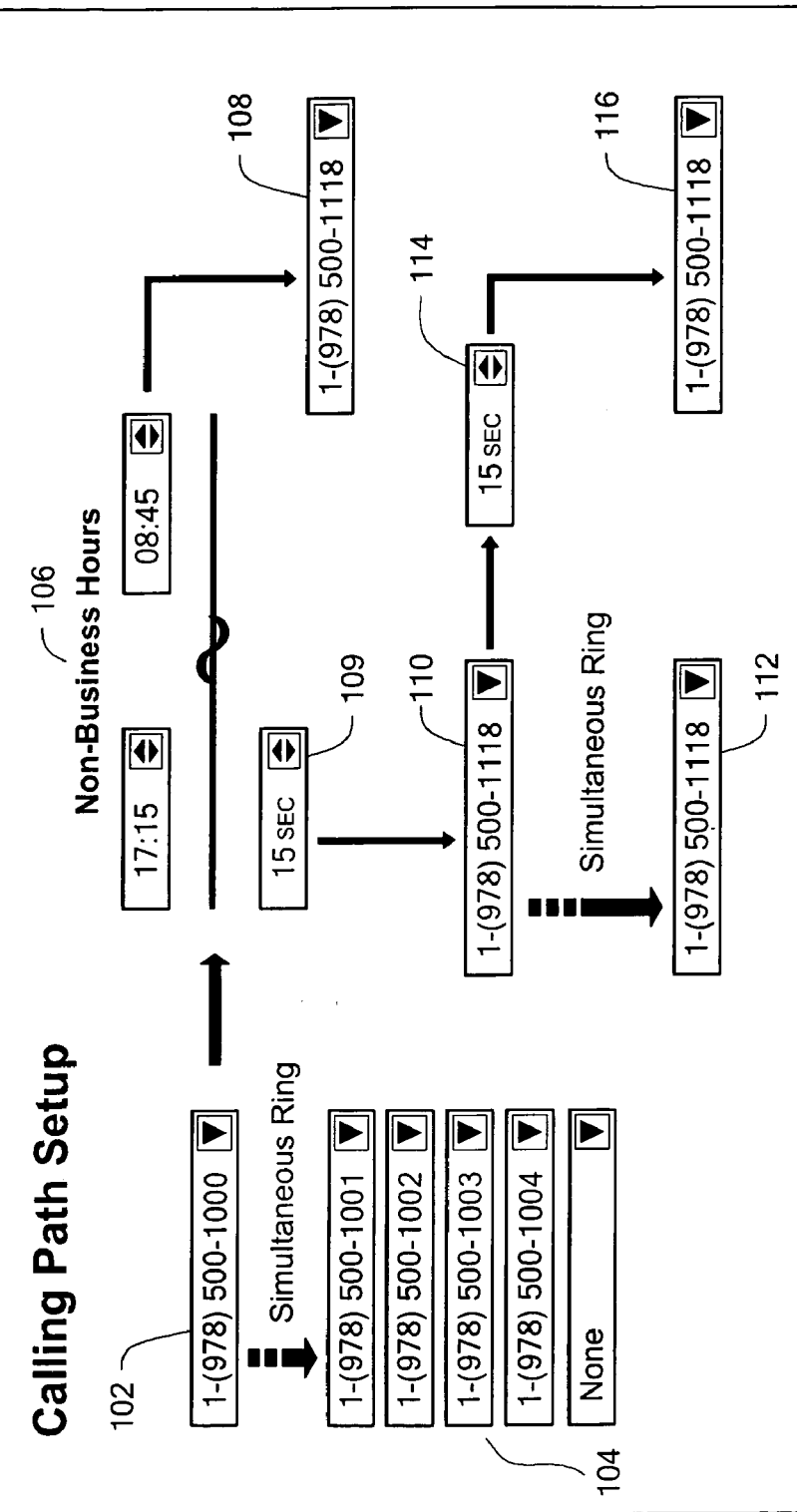
FIG. 3 shows an exemplary central line setup screen in accordance with an embodiment of the present invention.

FIG. 3 shows an exemplary central line setup screen 100 in accordance with an embodiment of the present invention. When the feature server receives a call to the central telephone number 102, the feature server causes the extension phone numbers 104 to be called simultaneously, except during specified non-business hours 106, in which case the non-business hours telephone number 108 is called. If the extension phone numbers 104 are called and none are answered within a predetermined time 109, then an alternate number 110 is called. If any other numbers are listed in 112, then those numbers are called simultaneously. If no call is answered within a predetermined time 114, then a last number 116 is called.

Figure 4:
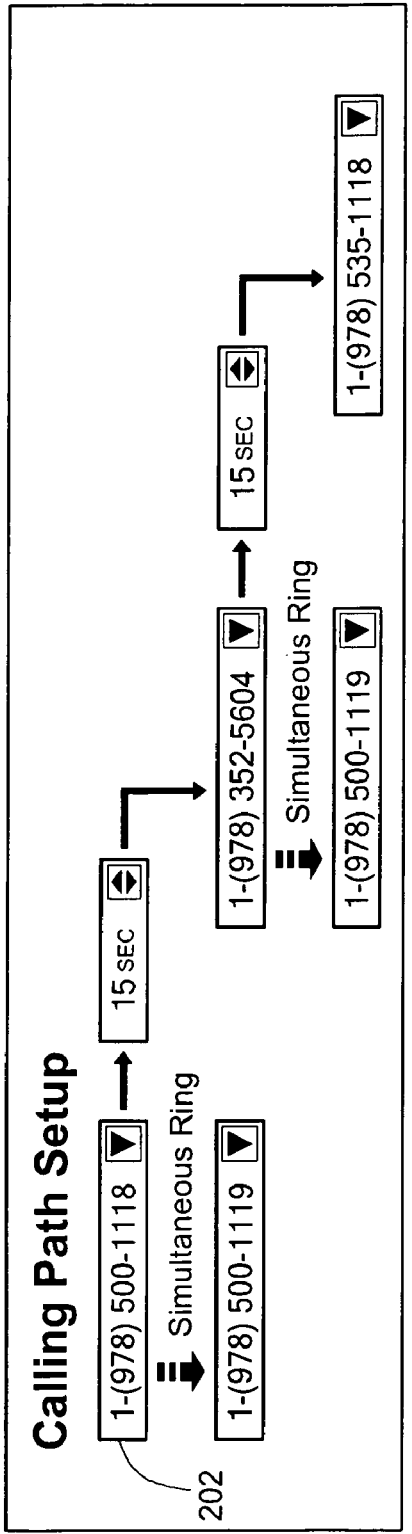
FIG. 4 shows an exemplary direct line setup screen and an exemplary trust setup screen in accordance with an embodiment of the present invention.
Figure 4:
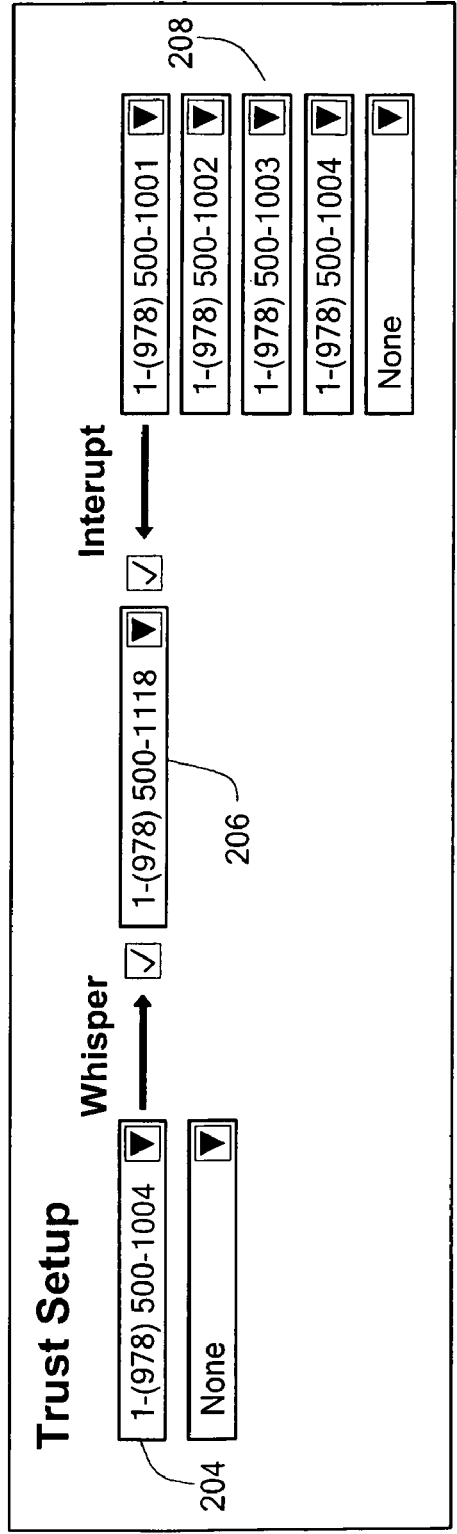

FIG. 4 shows an exemplary direct line setup screen and an exemplary trust setup screen in accordance with an embodiment of the present invention. This is very similar to central call setup, except that the telephone number 202 would typically be the actual number associated with the subscriber (e.g., home phone number or direct work number). Again, the subscriber can specify simultaneous ring and alternate numbers as well as the amount of time to delay before forwarding to an alternate number. The subscriber can also specify, for the phone number 206, a number of "whisper" numbers 204 (i.e., persons who are permitted to speak to the subscriber when the subscriber is on a phone call) and a number of "interrupt" numbers 208 (i.e., persons who are permitted to interrupt the subscriber when the subscriber is on a phone call).

Figure 5:
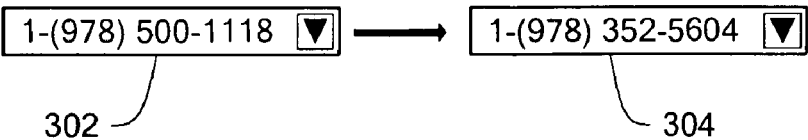
FIG. 5 shows an exemplary default setup screen in accordance with an embodiment of the present invention.

FIG. 5 shows an exemplary default setup screen in accordance with an embodiment of the present invention. Here, the subscriber can specify a default telephone number 304 to be called in case the main number 302 is unavailable due to an Internet failure.

These set up screen shots should illustrate that a PBX is no longer a necessity. However, this type of IP phone can work with an existing PBX installed. Over time, this scalability will obsolete the PBX as more and more IP phone features replace the current PBX's features until the PBX is no longer needed.

In one exemplary embodiment of the invention, VoIP modems of the type described above are added into corporate telephone networks. The user generally connects the VoIP modem to the corporate network and sets the feature server to work with the current system. Phone calls are essentially free. Rather than buying expensive phones for use with the PBX, the subscriber can purchase inexpensive analog phones (or, for that matter, fancy "designer" phones that look better than traditional business phones). Even if the office changes its layout, or someone is transferred to another office, the phone number would not have to be changed. All that would need to be done is to use the VoIP modem, access the Web, and make any necessary changes to the screen setups (e.g., new secretary's number). The system could easily transition exclusively to VoIP, in which case the PBX could be eliminated.

It is preferable, although not required, for the VoIP modem to be designed to be thin and flat, with all connectors in the back and LEDs in the front of the unit. This way, the telephone set of a customer's choice (any normal analog telephone would do) could sit on top of it without taking up extra space or giving a cheap and awkward appearance on the office desk.

In order to provide certain advanced telephone functions using analog telephones (such as speakerphone, announce and transfer, and hands-free answer), certain VoIP modems in accordance with an embodiment of the present invention would include a built-in speaker and possibly a microphone, as described above.

It is desirable for the feature servers to be available regardless of what ISP the customer using. Therefore, the broadband (BB) phone must work from inside routers/NAT translators and firewalls without an explicit global IP (GIP) address assigned for the VoIP modem.

The BB Internet Service can use any technology, including cable modem and ADSL. For larger customers, such as corporate users, fiber connectivity to the Internet could be used.

The feature service should be available for both residential and corporate users. Varying the available features should differentiate the types of service. It is scalable from residential to corporate. For example, residential may not require central number service.

The VoIP modem should be considered as an embodiment of the invention in and of itself—either sold stand-alone or leased.

Figure 6:
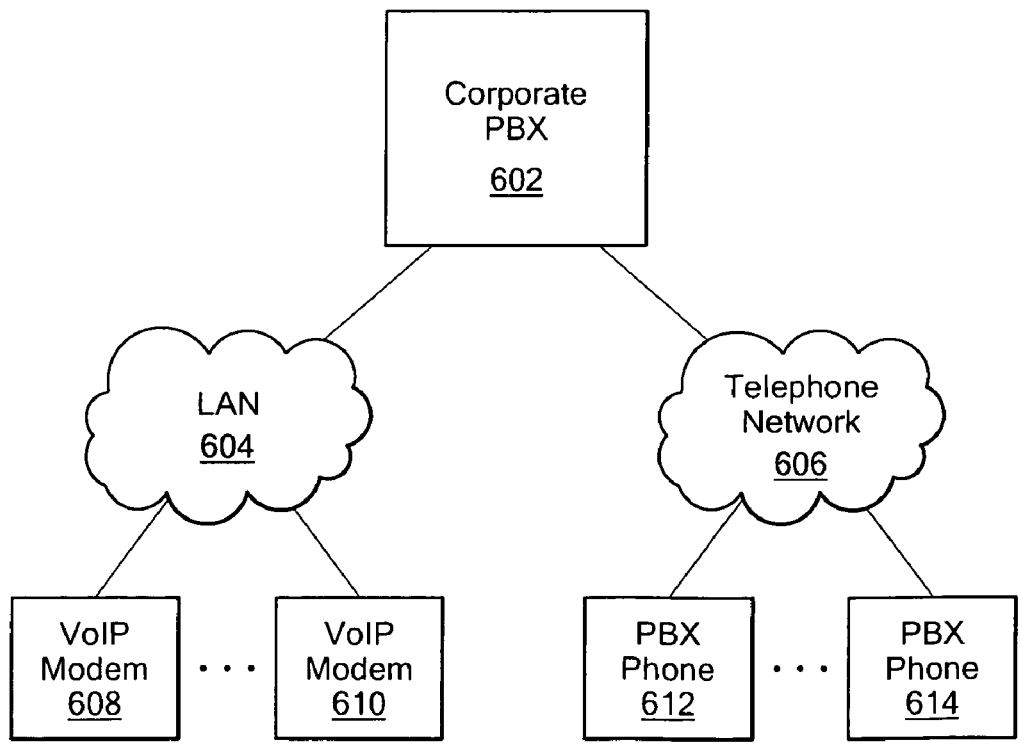
FIG. 6 shows a corporate telephone system incorporating both PBX and VoIP technologies in accordance with an embodiment of the present invention.

FIG. 6 shows a corporate telephone system incorporating both PBX and VoIP technologies in accordance with an embodiment of the present invention. Among other things, the telephone system includes a corporate PBX 602 in communication with VoIP modems 608 and 610 over a LAN 604 and in communication with PBX phones 612 and 614 over a telephone network. The VoIP modems 608 and 610 preferably include personal feature servers that can be managed by the corresponding user so that central management of the user's specific telephone requirements is not needed. The VoIP modems 604 can be physically moved from place to place, and phone calls from the corporate PBX 602 will be forwarded correctly without any configuration changes to the corporate PBX 602.

Figure 7:
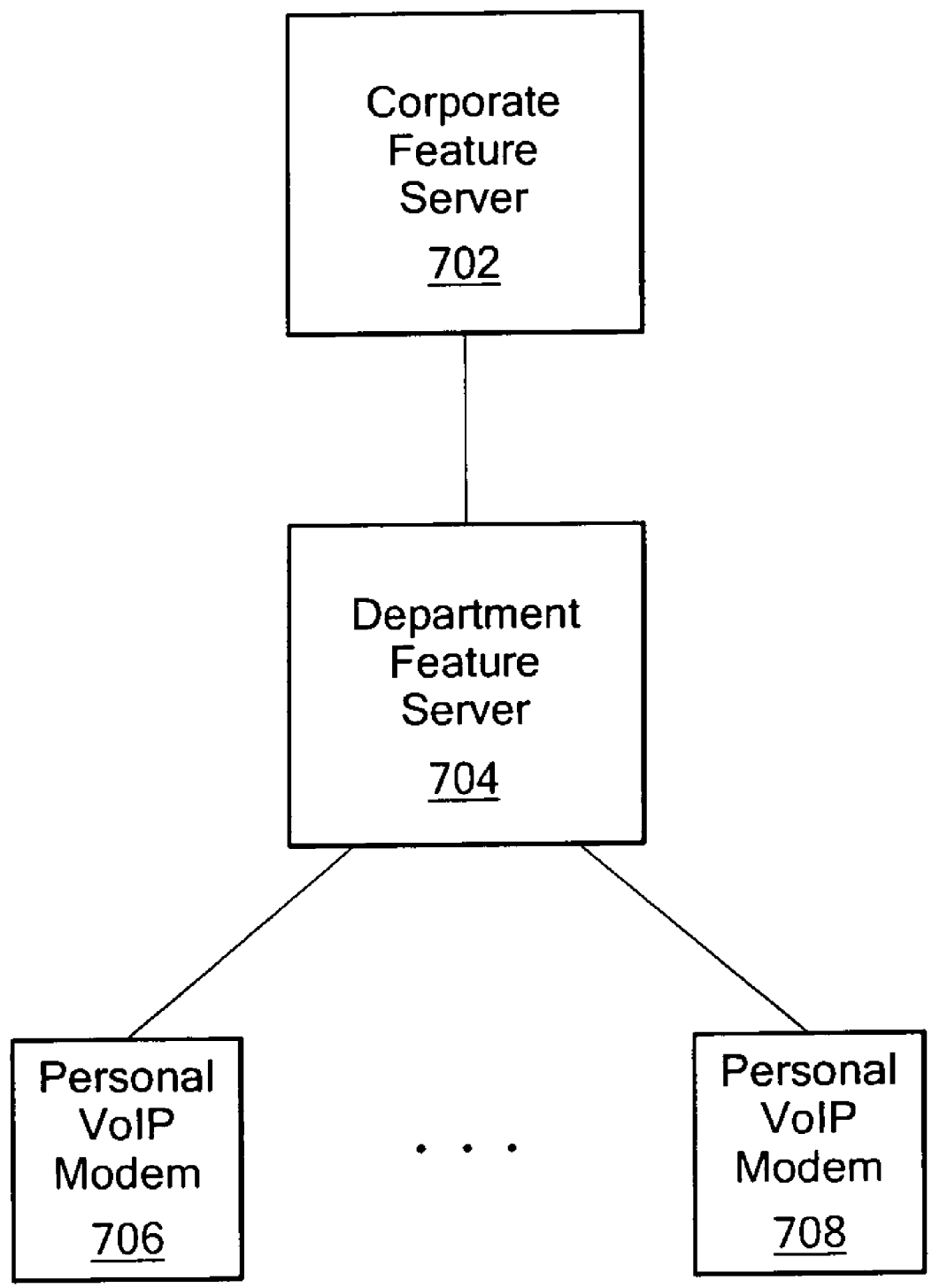
FIG. 7 shows a hierarchical telephone system in accordance with an embodiment of the present invention.

FIG. 7 shows a hierarchical telephone system in accordance with an embodiment of the present invention. Among other things, the telephone system includes a corporate feature server 702, a number of department feature servers 704, and, for each department feature server 704, a number of personal VoIP modems 706 and 708. The corporate feature server 702 can be managed by a corporate manager and relates to the entire corporation. Telephone calls received at the corporate feature server 702 can be forwarded to the appropriate department feature server 704 according to the extension requested. The department feature servers 704 can be managed at the departmental level without impacting the corporate feature server 702. Telephone calls received at the departmental feature server 704 can be forwarded to a personal VoIP modem according to the extension requested. Because, as discussed above in connection with FIG. 2, each personal VoIP modem includes a personal feature server, the personal VoIP modems 706 and 708 can be managed by their respective users without impacting the corporate or departmental feature servers. Telephone calls received at the personal VoIP modems 706 and 708 can be forwarded according to the rules provided by the users. Also, it can be seen that the hierarchical telephone system includes at least one feature server at each level of the hierarchy.

As discussed, an advantage of the personal VoIP modems is that the users can manage their own telephone environments without impacting the corporate or department feature servers and without involving the corporate or departmental managers. Thus, for example, if a user's secretary is unavailable, the user can easily reconfigure his or her personal feature server to forward calls to a different secretary. If the user will be temporarily in a different location, then the user can easily reconfigure his or her personal feature server to forward or simultaneously ring to the expected location. If the user's cell phone number changes, the user can easily reconfigure his or her personal feature server to forward calls to the new cell phone. If the user is expecting a telephone call from a particular person, the user can reconfigure his or her personal feature server to interrupt when the telephone call is received. In the past, many of these features either were not available to individual users or required that changes be coordinated through a telephone system manager.

Figure 8:
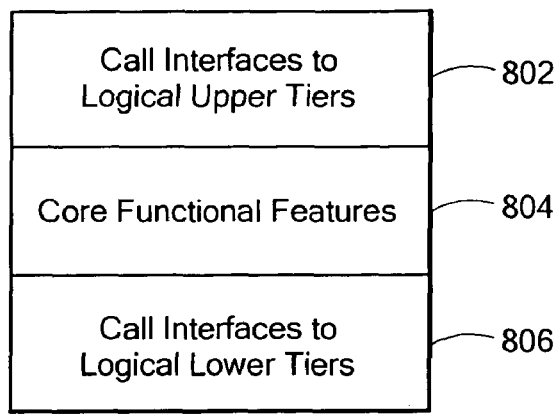
FIG. 8 shows a conceptual view of a feature server module in accordance with an exemplary embodiment of the present invention.

As shown in FIG. 8, the feature server modules can be viewed conceptually as including three main functional blocks, namely a set of core functional features 804 sandwiched between a set of call interfaces to logical upper tiers 802 and a set of call interfaces to logical lower tiers 806.

Generally speaking, calls forwarded to the feature server module (e.g., from an upper tier) are received by the call interfaces 802 and are passed to the core functional features 804 for processing. A particular call might terminate at the feature server module or might need to be forwarded to one or more other feature server modules (e.g., at a lower tier) via the call interfaces 806, for example, if the call is not destined for the feature server module or call forwarding is warranted according to the call handling rules enforced by the core functional features 804.

Feature server modules can be logically interconnected in virtually unlimited ways in order to achieve desired functionality. For example, in addition to configurations shown and described above with reference to FIGS. 6 and 7, feature server modules can be interconnected with various levels of hierarchy, both with and without interconnections to PBXs and/or the PSTN.

Figure 9:
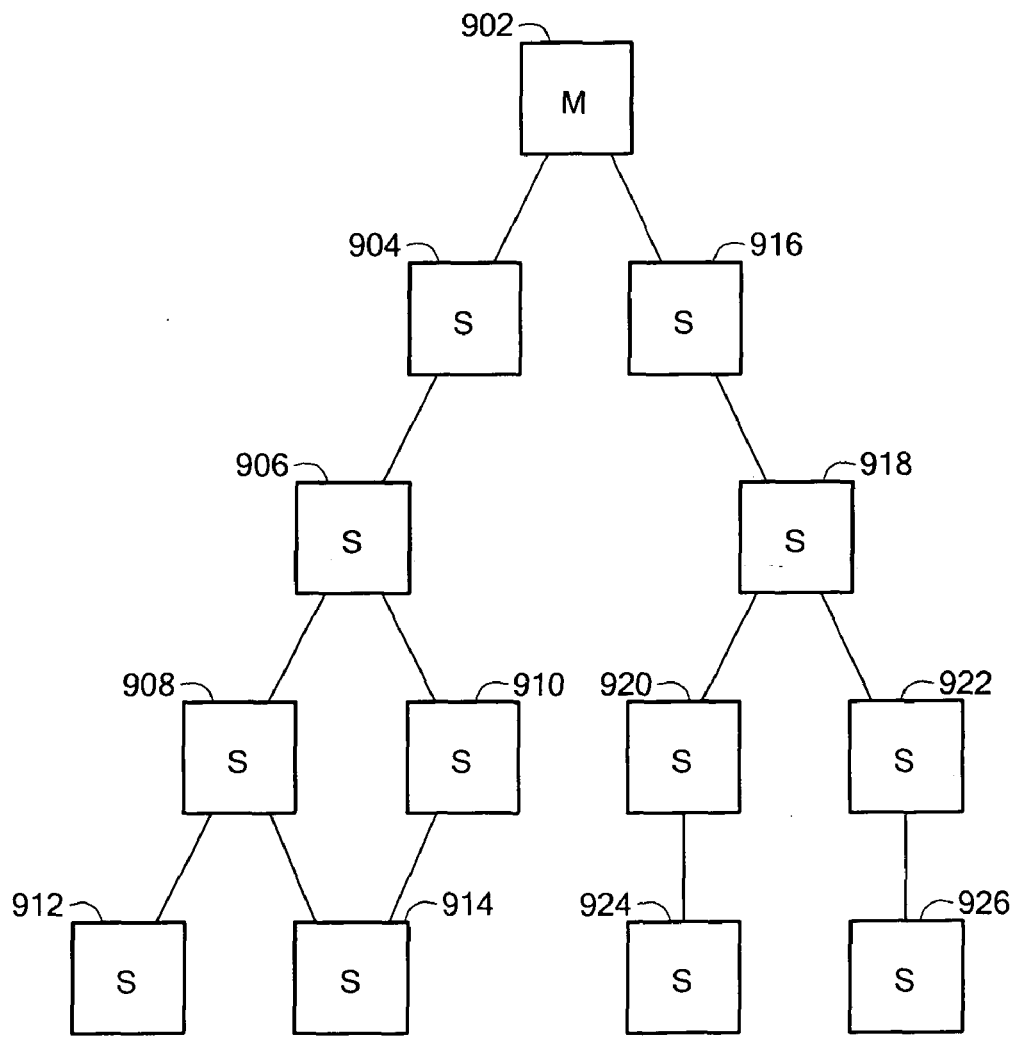
FIG. 9 is a block diagram representing an exemplary "pure" form of VPBX without interconnections to PBXs or the PSTN, in accordance with an exemplary embodiment of the present invention.

FIG. 9 is a block diagram representing an exemplary "pure" form of VPBX without interconnections to PBXs or the PSTN, in accordance with an exemplary embodiment of the present invention. The VPBX includes a main feature server module 902 and a plurality of subordinate feature server modules 904-926. In this VPBX, all calls are received through the main feature server module 902 and then are forwarded from module to module as needed, in accordance with the core functional features processing at each successive module.

Figure 10:
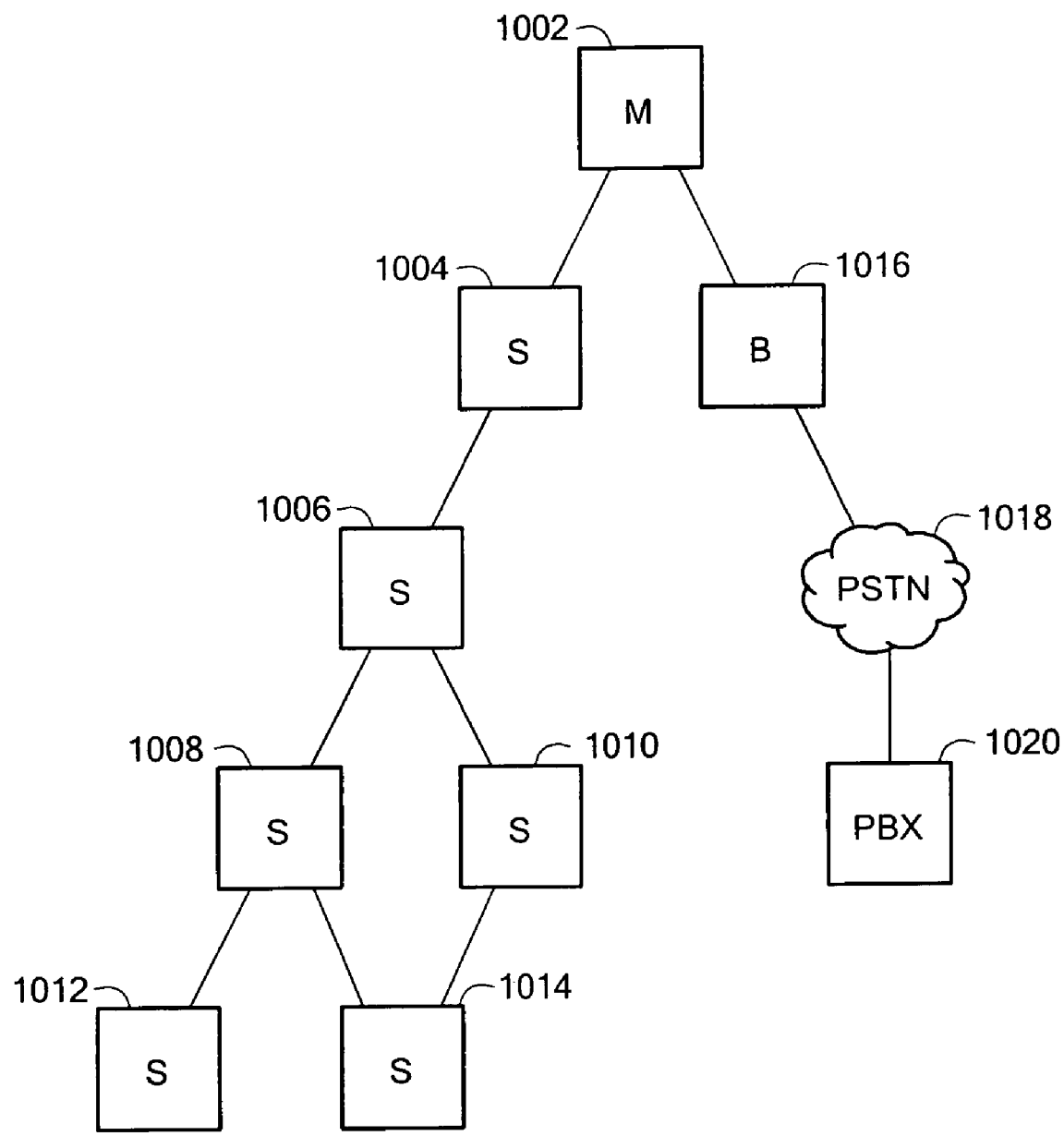
FIG. 10 is a block diagram representing a "hybrid" system in which a PBX is subordinate to a VPBX, in accordance with an exemplary embodiment of the present invention.

FIG. 10 is a block diagram representing a "hybrid" system in which a PBX is subordinate to a VPBX, in accordance with an exemplary embodiment of the present invention. The VPBX includes main feature server module 1002, a plurality of subordinate feature server modules 1004-1016, including a subordinate feature server module 1016 that acts as a bridge to a PBX 1020 that is coupled to the VPBX through PSTN 1018. For each call received through the main feature server module 1002, the main feature server module 1002 determines whether the call is related to the VPBX or the PBX 1020. Calls related to the VPBX are forwarded from module to module as needed, in accordance with the core functional features processing at each successive module. Calls related to the PBX 1020 are forwarded to the bridge module 1016, which forwards the call to the PBX 1020 via the PSTN 1018. It should be noted that bridge functionality could be integrated into the main module 1002.

Figure 11:
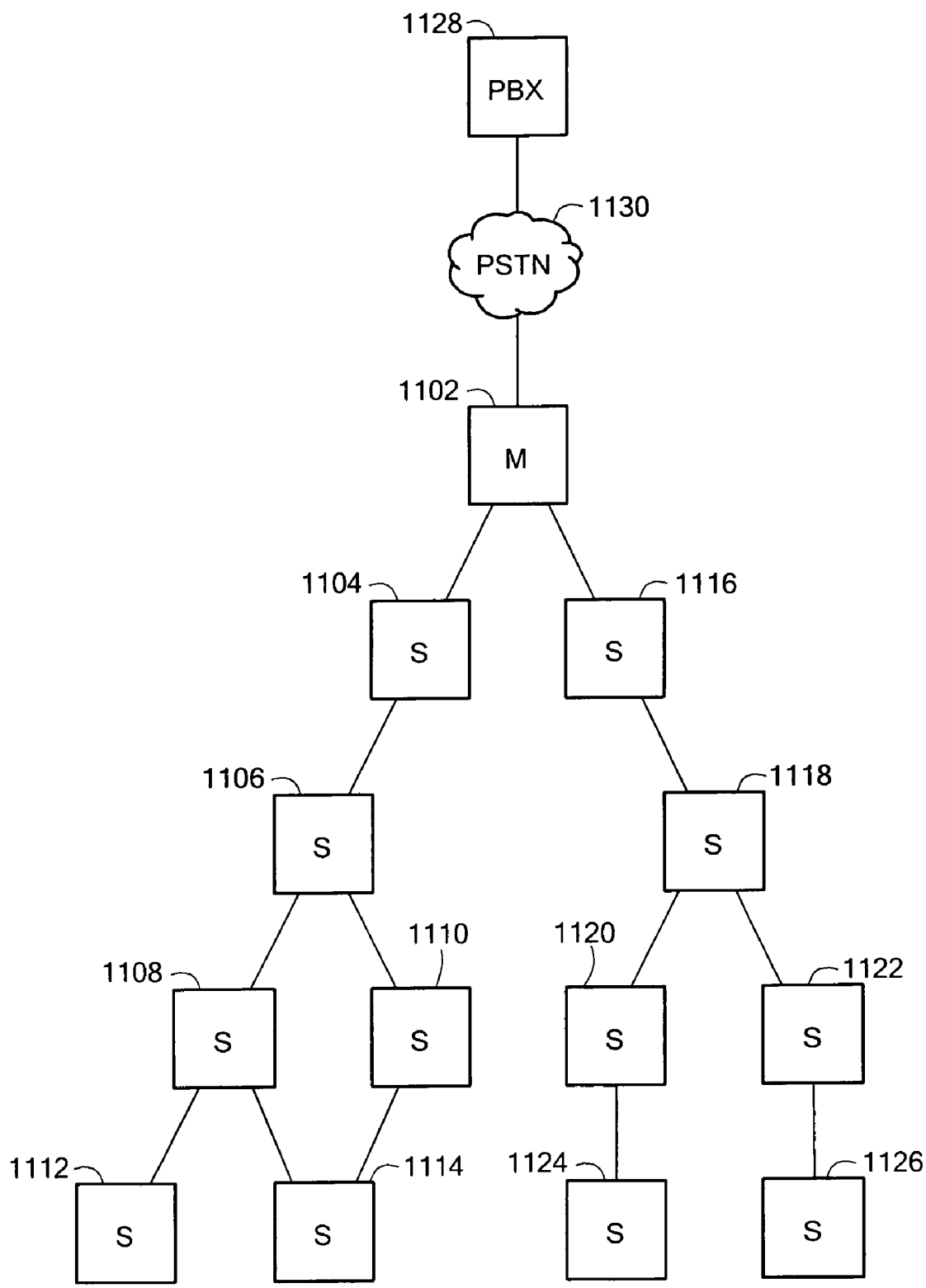
FIG. 11 is a block diagram representing a "hybrid" system in which a VPBX is subordinate to a PBX, in accordance with an exemplary embodiment of the present invention.

FIG. 11 is a block diagram representing a "hybrid" system in which a VPBX is subordinate to a PBX, in accordance with an exemplary embodiment of the present invention. The VPBX includes a main feature server module 1102 and a plurality of subordinate feature server modules 1104-1126. In this VPBX, all calls are received at the PBX 1128, which forwards appropriate calls to the main feature server module 1103 via PSTN 1130. The calls are then forwarded from module to module as needed, in accordance with the core functional features processing at each successive module.

Figure 12:
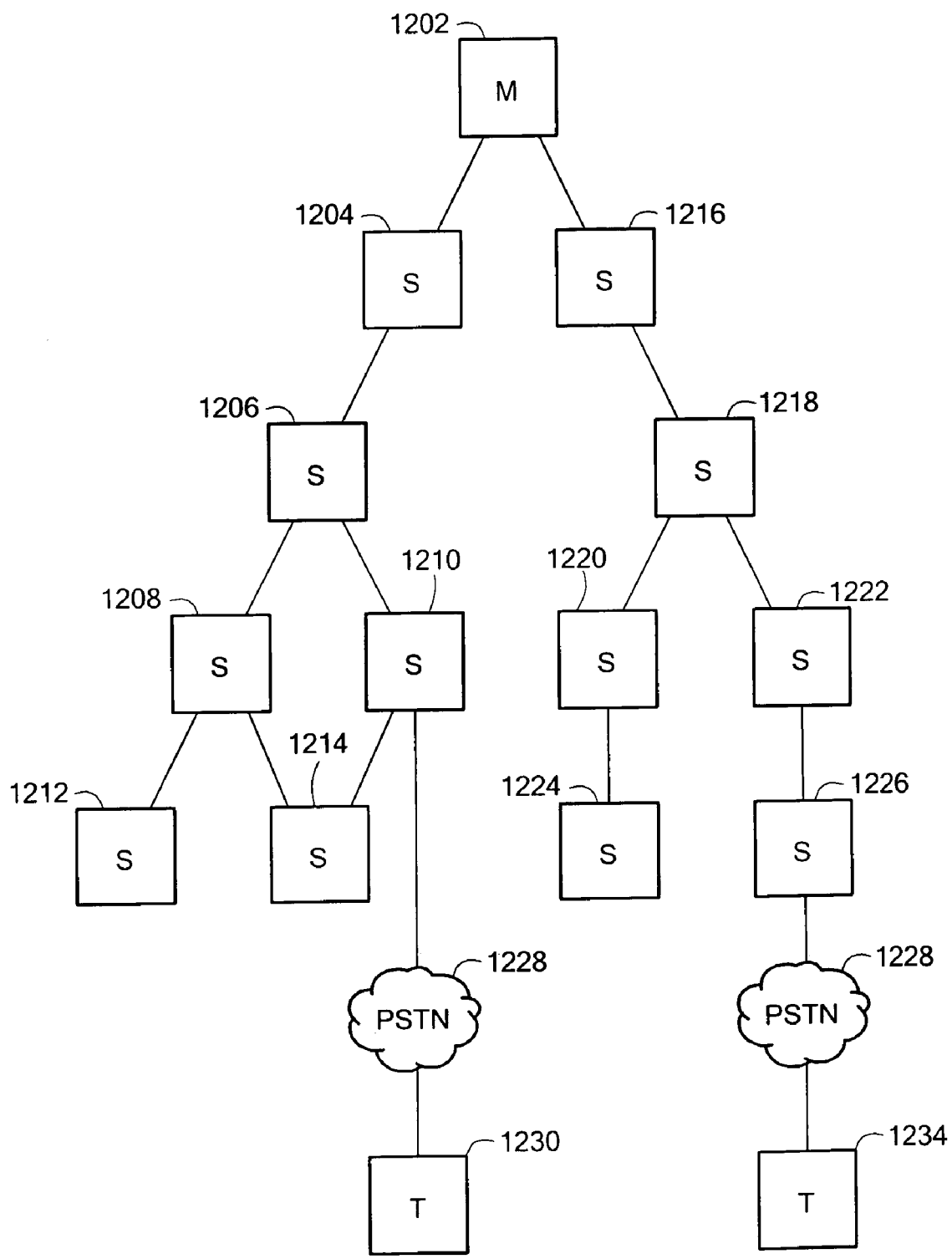
FIG. 12 is a block diagram representing a "hybrid" system in which a VPBX interoperates with "plain old telephone" (POT) devices, in accordance with an exemplary embodiment of the present invention.

FIG. 12 is a block diagram representing a "hybrid" system in which a VPBX interoperates with "plain old telephone" (POT) devices, in accordance with an exemplary embodiment of the present invention. The VPBX includes a main feature server module 1202 and a plurality of subordinate feature server modules 1204-1226. In this VPBX, all calls are received through the main feature server module 1202 and then are forwarded from module to module as needed, in accordance with the core functional features processing at each successive module. Calls can ultimately be forwarded to POT devices 1230 and 1234 over the PSTN 1228. The POT devices 1230 and 1234 represent the lowest tier of the system.

While the exemplary systems described above represent the VPBX as a top-to-bottom hierarchy of feature server modules, in practice, the VPBX typically does not operate as a strict top-to-bottom hierarchy. For example, calls may be forwarded between peer modules at any tier of the hierarchy or may be forwarded from a lower tier module to a higher tier module.

Figure 13:
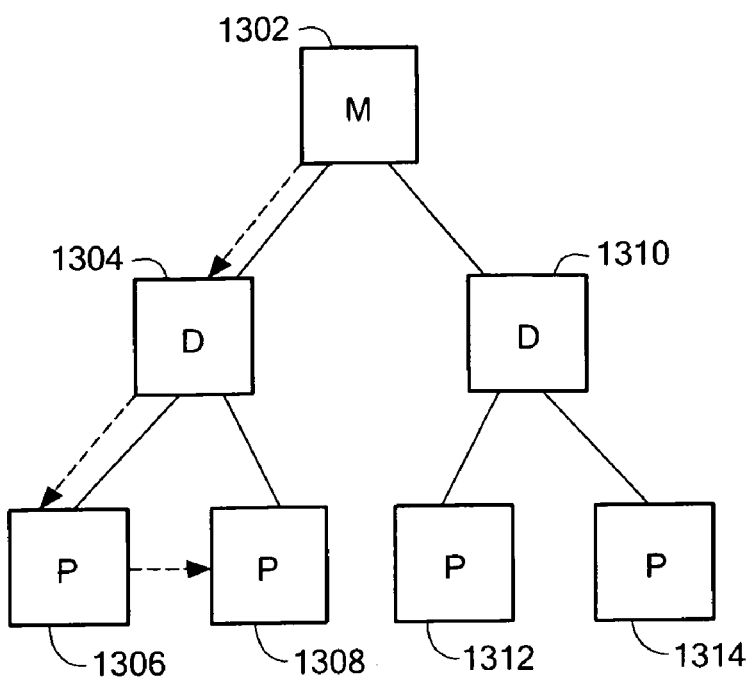
FIG. 13 is a block diagram showing a representation of a direct peer-to-peer call transfer between personal feature server modules, in accordance with an exemplary embodiment of the present invention.

FIG. 13 is a block diagram showing a representation of a direct peer-to-peer call transfer between personal feature server modules, in accordance with an exemplary embodiment of the present invention. The VPBX includes a main feature server module 1302, two department feature server modules 1304 and 1310 serviced by the main feature server module 1302, and personal feature server modules 1306, 1308, 1312, and 1314 serviced by the department feature server modules 1304 and 1310. A call intended for personal feature server module 1306 is forwarded by the main feature server module 1302 to the department feature server module 1304 and by the department feature server module 1304 to the personal feature server module 1306. The personal feature server module 1306 processes the call according to a predetermined set of rules, which may, for example, cause the call to be forwarded to personal feature server 1308 (e.g., a backup or secretary) under certain conditions (e.g., the telephone being serviced by personal feature server module 1306 is busy or goes unanswered for a predetermined number of rings).

Figure 14:
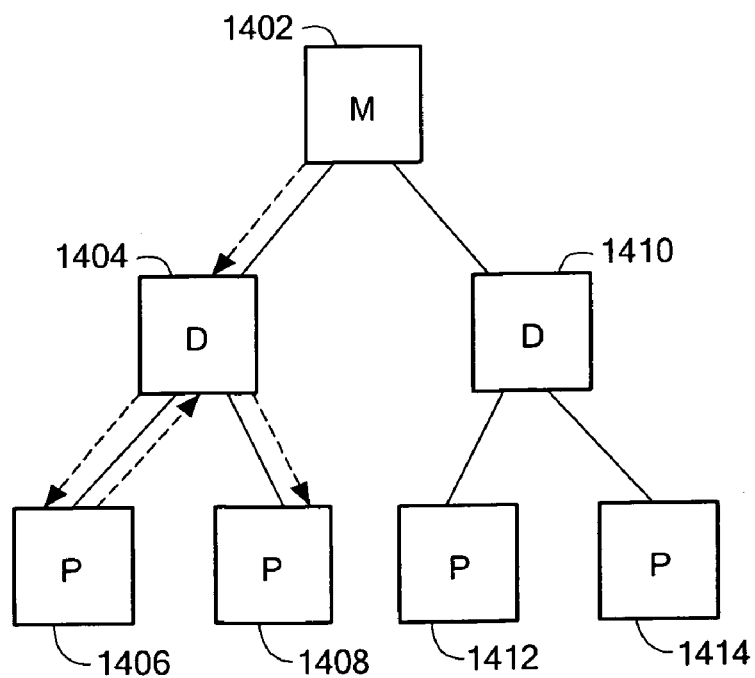
FIG. 14 is a block diagram showing a representation of an indirect peer-to-peer call transfer between personal feature server modules, in accordance with an exemplary embodiment of the present invention.

FIG. 14 is a block diagram showing a representation of an indirect peer-to-peer call transfer between personal feature server modules, in accordance with an exemplary embodiment of the present invention. The VPBX includes a main feature server module 1402, two department feature server modules 1404 and 1410 serviced by the main feature server module 1302, and personal feature server modules 1406, 1408, 1412, and 1414 serviced by the department feature server modules 1404 and 1410. A call intended for personal feature server module 1406 is forwarded by the main feature server module 1402 to the department feature server module 1404 and by the department feature server module 1404 to the personal feature server module 1406. The personal feature server module 1406 processes the call according to a predetermined set of rules, which may, for example, cause the call to be forwarded back to department feature server module 1404 and on to personal feature server 1408 (e.g., a backup or secretary) under certain conditions (e.g., the telephone being serviced by personal feature server module 1406 is busy or goes unanswered for a predetermined number of rings).

Figure 15:
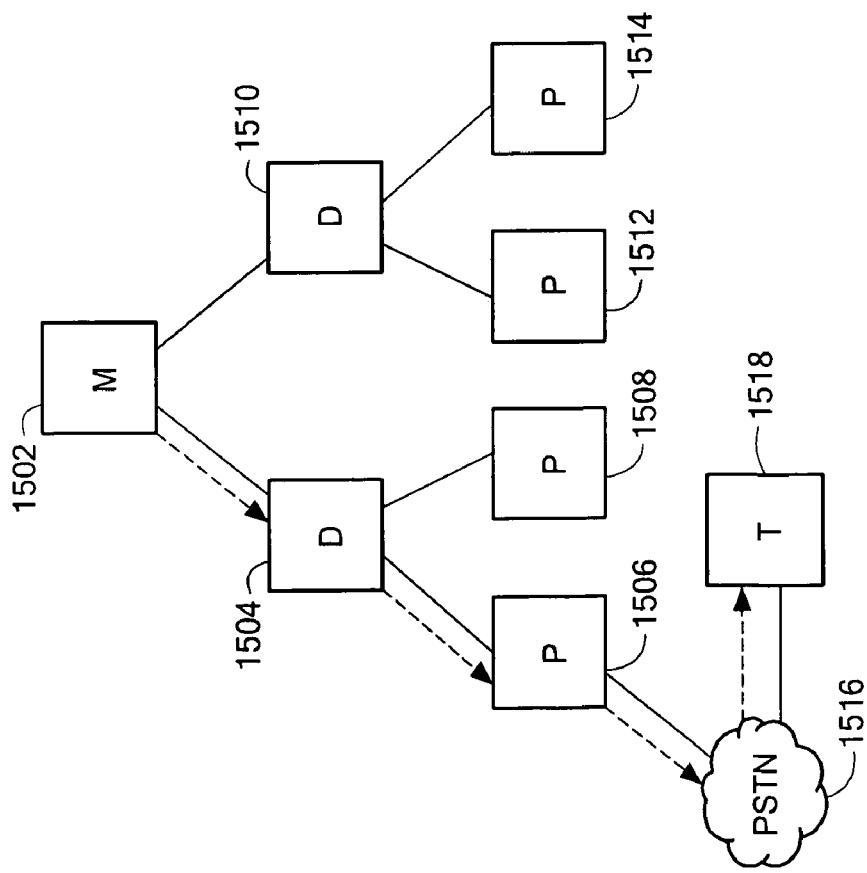
FIG. 15 is a block diagram showing a representation of a call transfer to an external telephone, in accordance with an exemplary embodiment of the present invention.

FIG. 15 is a block diagram showing a representation of a call transfer to an external telephone, in accordance with an exemplary embodiment of the present invention. The VPBX includes a main feature server module 1502, two department feature server modules 1504 and 1510 serviced by the main feature server module 1502, and personal feature server modules 1506, 1508, 1512, and 1514 serviced by the department feature server modules 1504 and 1510. A call intended for personal feature server module 1506 is forwarded by the main feature server module 1502 to the department feature server module 1504 and by the department feature server module 1504 to the personal feature server module 1506. The personal feature server module 1506 processes the call according to a predetermined set of rules, which may, for example, cause the call to be forwarded to an external telephone 1518 (e.g., a home phone or cell phone) via PSTN 1516 under certain conditions (e.g., the telephone being serviced by personal feature server module 1506 is busy or goes unanswered for a predetermined number of rings).

Figure 16:
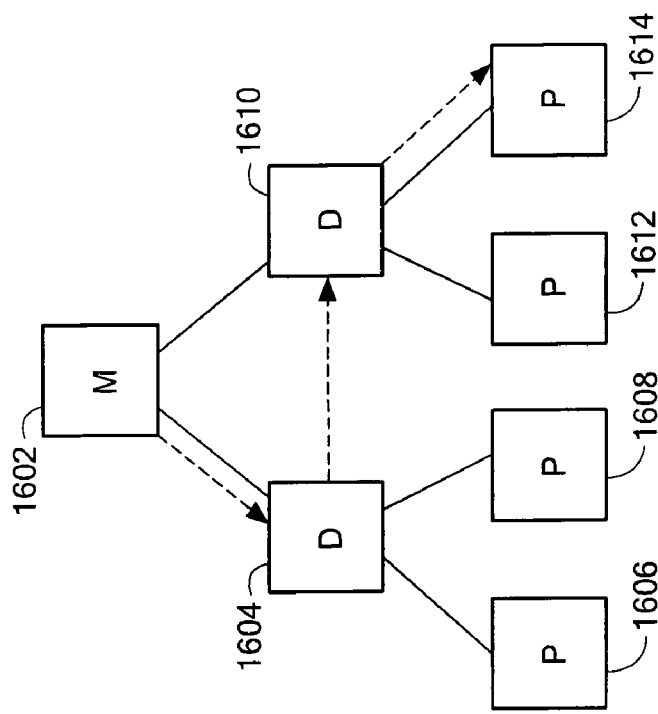
FIG. 16 is a block diagram showing a representation of a peer-to-peer call transfer between department feature server modules, in accordance with an exemplary embodiment of the present invention.

FIG. 16 is a block diagram showing a representation of a peer-to-peer call transfer between department feature server modules, in accordance with an exemplary embodiment of the present invention. The VPBX includes a main feature server module 1602, two department feature server modules 1604 and 1610 serviced by the main feature server module 1602, and personal feature server modules 1606, 1608, 1612, and 1614 serviced by the department feature server modules 1604 and 1610. A call intended for personal feature server module 1606 is forwarded by the main feature server module 1602 to the department feature server module 1604. The department feature server module 1604 processes the call according to a predetermined set of rules, which may, for example, cause the call to be forwarded to department feature server 1610 and on to personal feature server 1614 (e.g., a department receptionist) under certain conditions (e.g., the personal feature server 1606 is unreachable).

The VPBX paradigm can be expanded to include multiple VPBXs that interoperate such that some number of feature server modules operate in multiple VPBXs. A particular feature server module can be inherently part of multiple VPBXs (e.g., a person employed by Company X who is also a member of Association Y may operate a feature server module that is serviced by both Company X's VPBX and Association Y's VPBX), or the feature server module can be inherently part of one VPBX but receive calls forwarded from another VPBX (e.g., a person having a first feature server module operating in Company X's VPBX and a second feature server module operating in Association Y's VPBX may configure the second feature server module to forward calls to the first feature server module).

Figure 17:
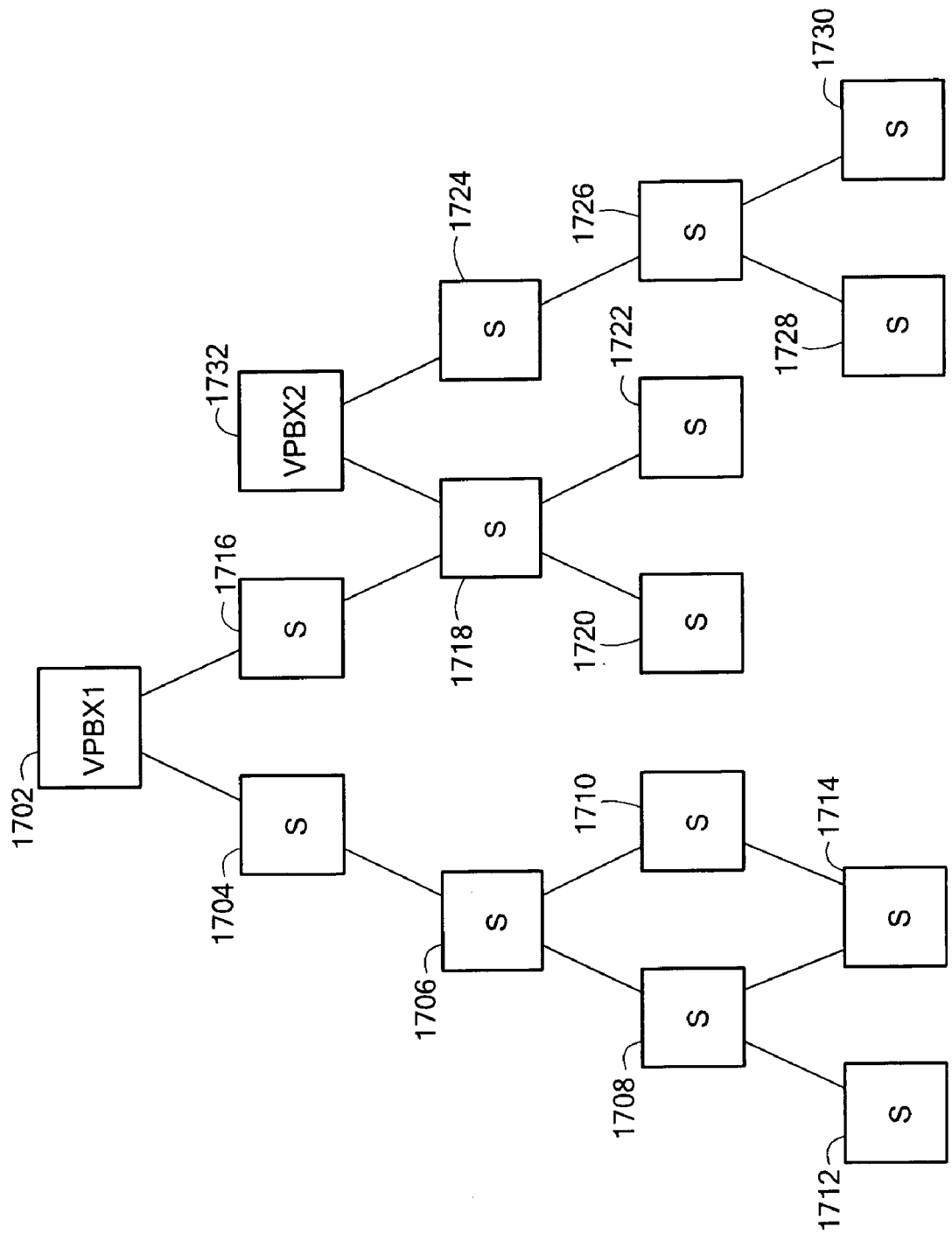
FIG. 17 is a block diagram showing a first multiple VPBX system, in accordance with an exemplary embodiment of the present invention.

FIG. 17 is a block diagram showing a first multiple VPBX system, in accordance with an exemplary embodiment of the present invention. A first VPBX (VPBX1) includes main feature server module 1702 and subordinate feature server modules 1704-1722, while a second VPBX (VPBX2) includes main feature server module 1732 and subordinate feature server modules 1718-1730. Thus, feature server modules 1718-1722 inherently operate in both VPBXs and can handle calls received through main feature server module 1702 as well as calls received through main feature server module 1732.

Figure 18:
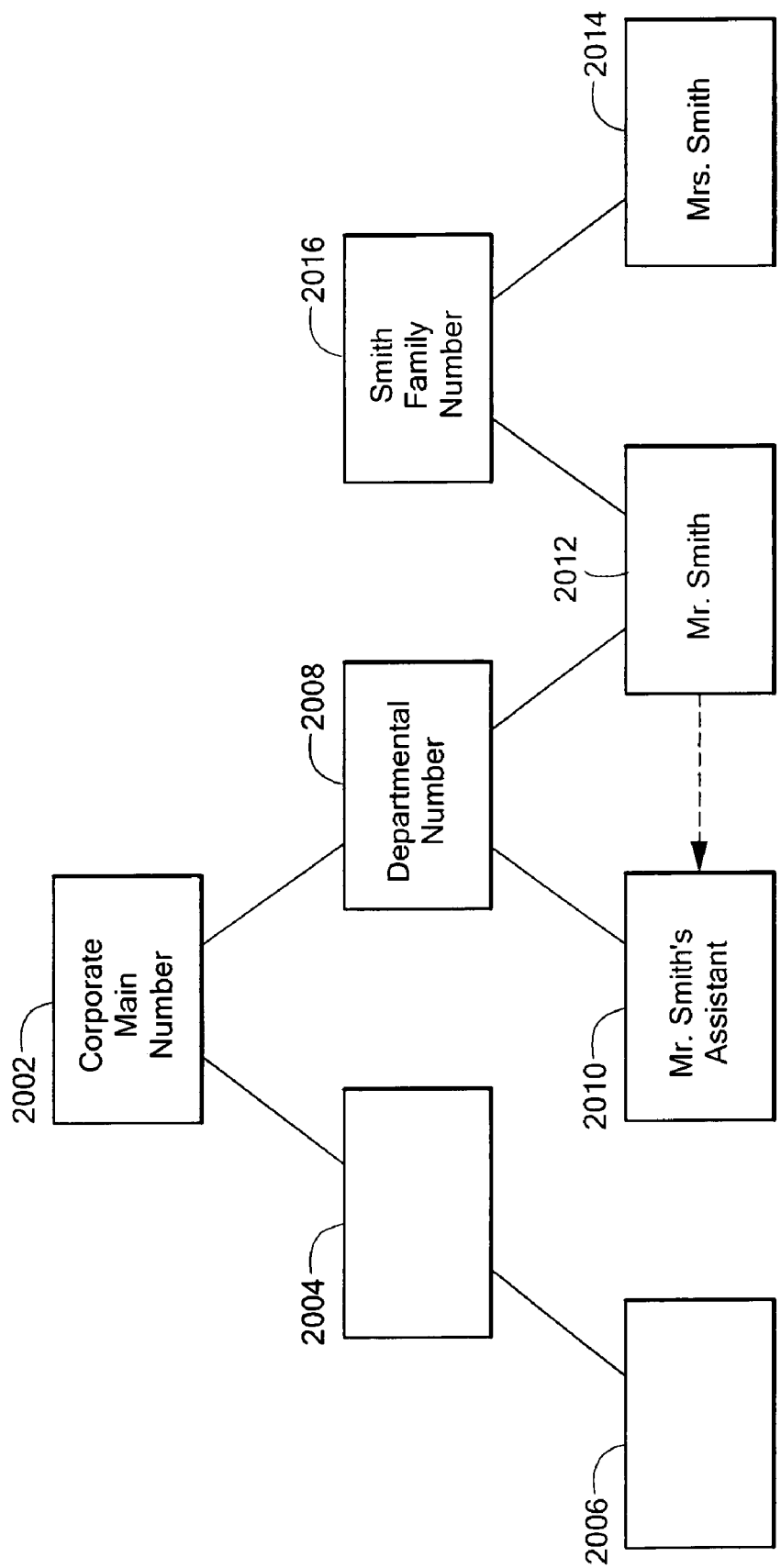
FIG. 18 is a block diagram showing a second multiple VPBX system, in accordance with an exemplary embodiment of the present invention.

FIG. 18 is a block diagram showing a second multiple VPBX system, in accordance with an exemplary embodiment of the present invention. A first (corporate) VPBX includes corporate main feature server module 2002 and subordinate feature server modules 2004-2012, including departmental feature server module 2008 servicing personal feature server modules for a Mr. Smith 2012 and Mr. Smith's assistant 2010. A second (personal) VPBX includes main feature server module 2016 and subordinate feature server modules 2012-2014, including personal feature server modules for Mr. Smith 2012 and Mrs. Smith 2014. In this example, calls received through the corporate main feature server module 2002 and/or the main feature server module 2016 for Mr. Smith could be forwarded by Mr. Smith's personal feature server module 2012 to Mr. Smith's assistant 2010.

It should be understood that, while the exemplary embodiments shown and described above with reference to FIGS. 17 and 18 show systems having two VPBXs, alternative systems can include three or more VPBXs.

When operating in multiple VPBXs, a feature server module can have separate rules for handling calls received from different VPBXs. For example, a particular feature server module may include one set of rules for handling calls received through main feature server module 1702 (e.g., for a call received through Company X's VPBX, forward the call to a company receptionist or voice mail) and a different set of rules for handling calls received through main feature server module 1732 (e.g., for a call received through Company Y's VPBX, forward the call to a personal cell or home phone).

Figure 19:
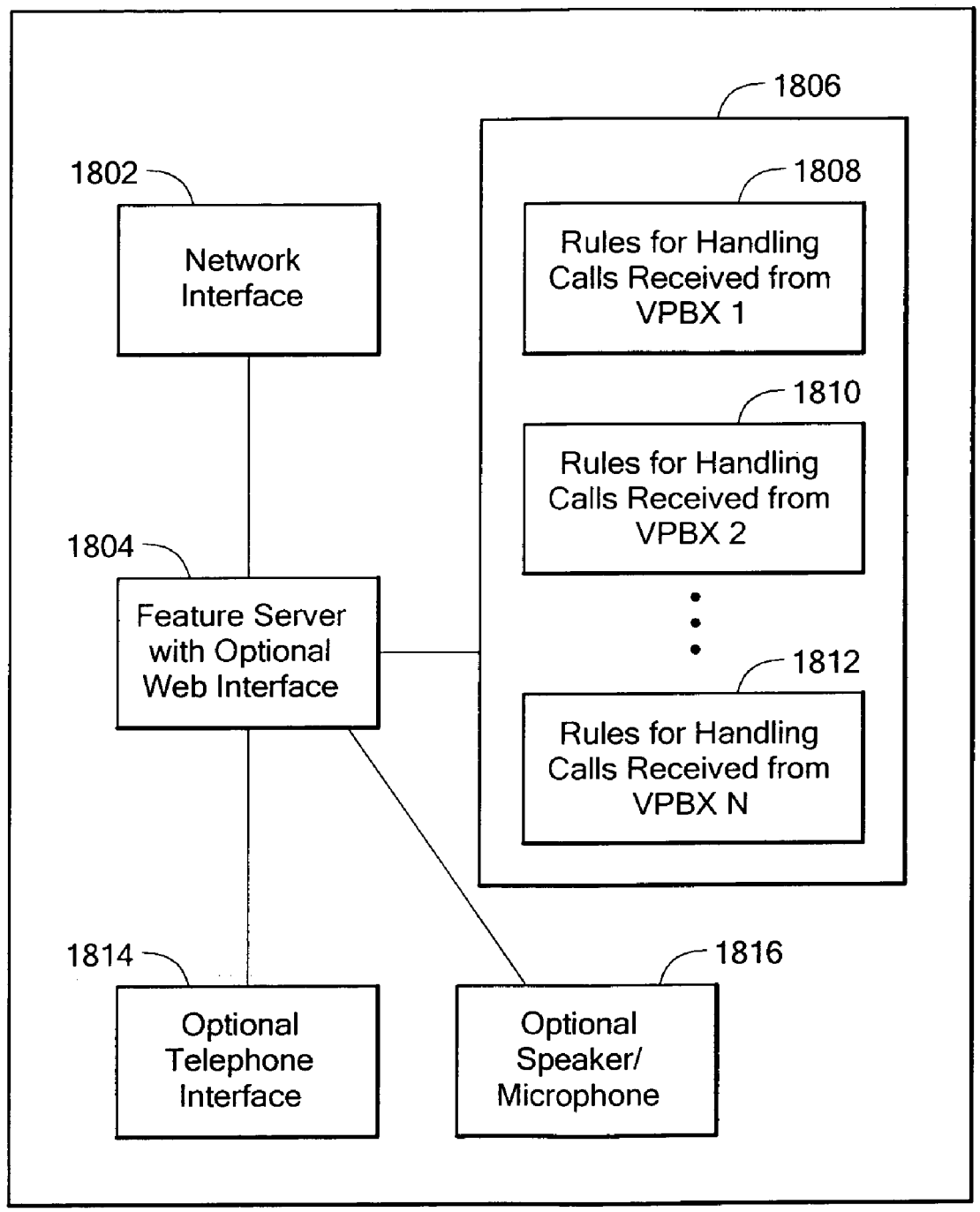
FIG. 19 is a schematic block diagram showing an exemplary feature server module that supports multiple sets of rules, in accordance with an exemplary embodiment of the present invention.

FIG. 19 is a schematic block diagram showing an exemplary feature server module that supports multiple sets of rules, in accordance with an exemplary embodiment of the present invention. Among other things, the feature server module includes a network interface 1802, a feature server 1804, and a memory 1806 in which is stored multiple sets of rules 1808-1812. The feature server 1804 may include an optional web interface for configuring the feature server rules. The feature server module may optionally include a telephone interface 1814 into which a standard analog telephone can be connected. The feature server module may optionally include a speaker and/or microphone 1816 for audio output and/or input. When a call is received via the network interface 1802, the feature server 1804 retrieves the appropriate set of rules from the memory 1806 and handles the call according to the retrieved set of rules.

Figures 20, 21:
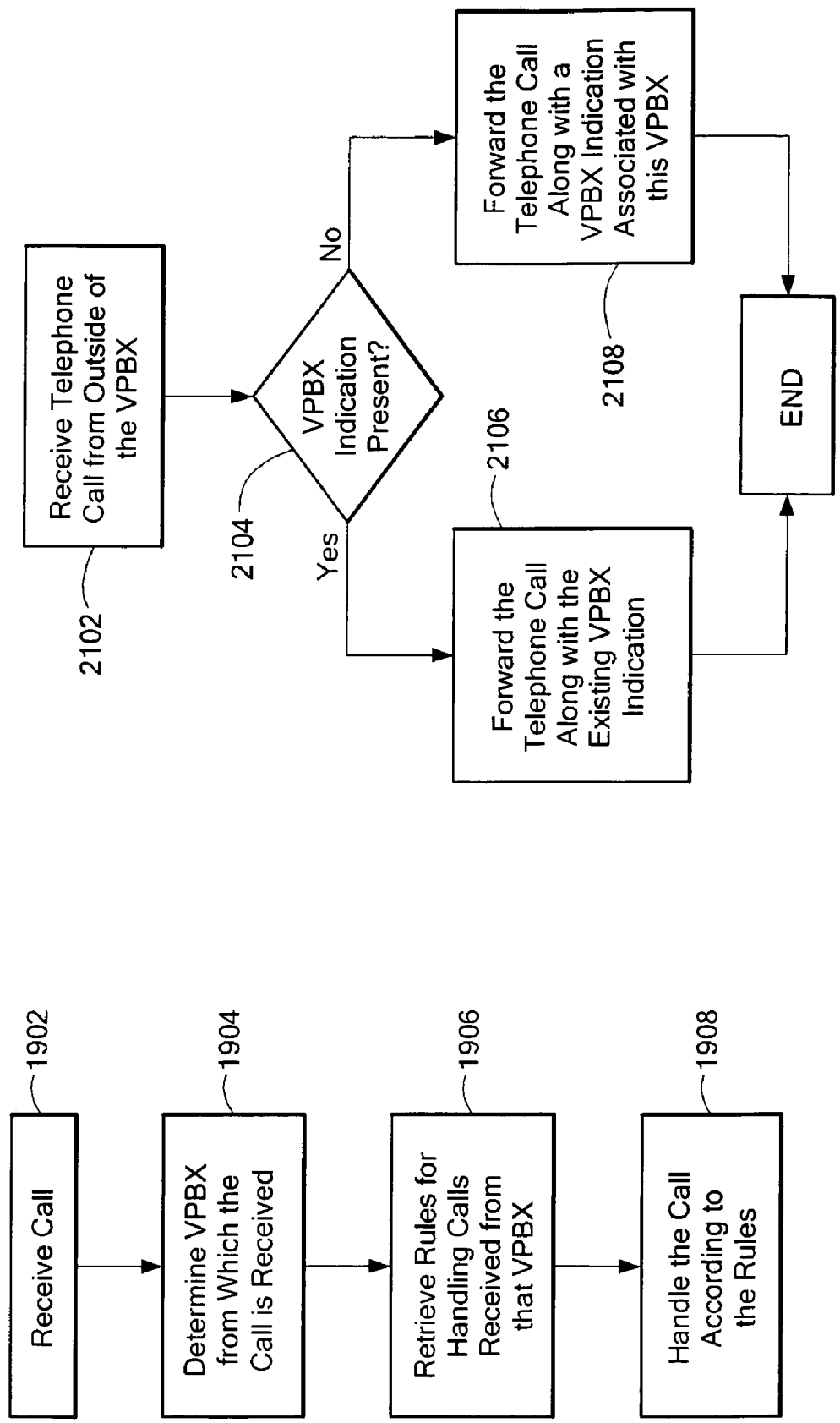
FIG. 20 is a logic flow diagram for handling a call, in accordance with an exemplary embodiment of the present invention.
FIG. 21 is a logic flow diagram for handling telephone calls by a main feature server module of a VPBX, in accordance with an exemplary embodiment of the present invention.

FIG. 20 is a logic flow diagram for handling a call, in accordance with an exemplary embodiment of the present invention. Upon receiving a call, in block 1902, the logic determines the VPBX from which the call is received, in block 1904. The logic then retrieves rules for handling calls received from that VPBX, in block 1906. The logic then handles the call according to the retrieved rules, in block 1908.

Thus, for example, in the system shown in FIG. 18, Mr. Smith's feature server module 2012 could have different rules for handling calls received from the corporate main feature server module 2002 and the Smith family feature server module 2016. For example, calls received from the corporate main feature server module 2002 could be forwarded to Mr. Smith's assistant 2010, while calls received from the Smith family feature server module 2016 could be forwarded to Mrs. Smith's feature server module 2014.

In order to support the use of multiple sets of rules, the protocol used to forward calls may include, or be revised to include, a mechanism for indicating the originating VPBX for the call. The indication would typically be introduced by the main feature server module of a VPBX and be forwarded along with the call module-by-module. Each feature server module could use the indication to perform VPBX-specific handling of the call.

Thus, for example, in the system shown in FIG. 18, the main feature server modules 2002 and 2016 could forward calls for Mr. Smith along with an indication as to the original VPBX for the call. Mr. Smith's personal feature server module 2012 could use the indication received along with a call to identify the original VPBX for the call and apply the appropriate rules to the call.

FIG. 21 is a logic flow diagram for handling telephone calls by a main feature server module of a VPBX, in accordance with an exemplary embodiment of the present invention. Upon receiving a telephone call from outside of the VPBX, in block 2102, the main feature server module determines whether the telephone call was received along with a VPBX indication associated with another VPBX, in block 2104. If the telephone call was received along with a VPBX indication associated with another VPBX (YES in block 2104), then the main feature server module forwards the telephone call along with the existing VPBX indication, in block 2106. If, however, the telephone call was not received along with a VPBX indication associated with another VPBX (NO in block 2104), then the main feature server module forwards the telephone call along with a VPBX indication associated with its VPBX, in block 2108.

Figure 22:
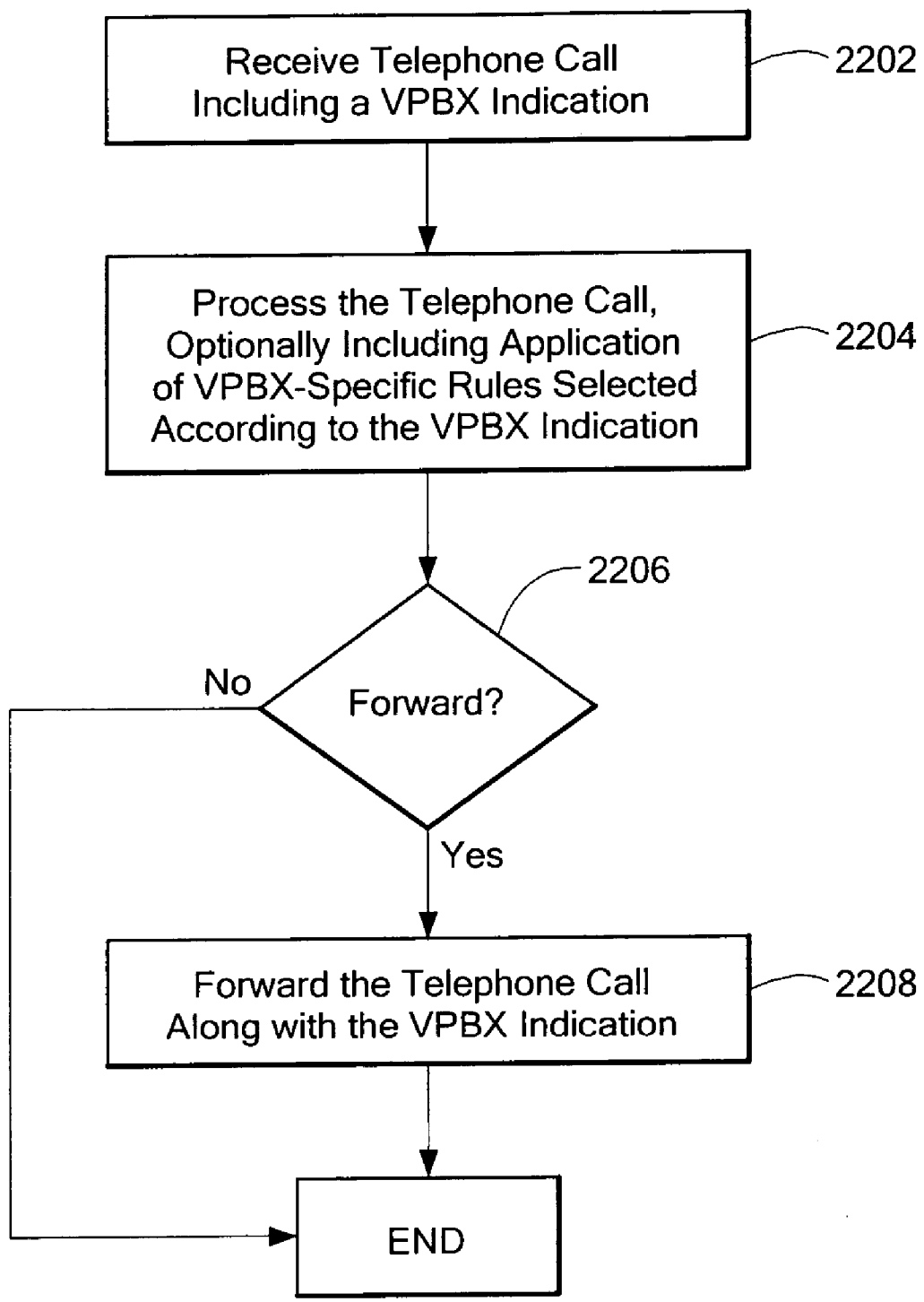
FIG. 22 is a logic flow diagram for handling telephone calls by a feature server module, in accordance with an exemplary embodiment of the present invention.

FIG. 22 is a logic flow diagram for handling telephone calls by a feature server module, in accordance with an exemplary embodiment of the present invention. Upon receiving a telephone call including a VPBX indication, in block 2202, the feature server module processes the telephone call, which may optionally include application of VPBX-specific rules selected according to the VPBX indication, in block 2204. As part of processing the telephone call, the feature server module determines whether the telephone call needs to be forwarded, in block 2206, and, if so (YES in block 2206), the feature server module forwards the telephone call along with the VPBX indication, in block 2208.

In essence, then, a plurality of feature server modules can be interconnected in virtually unlimited ways to form one or more VPBXs. Calls can be forwarded in multiple dimensions, including vertically within a VPBX (e.g., from higher-to-lower or lower-to-higher tiers), horizontally within a VPBX (e.g., peer-to-peer within a particular tier), and across multiple VPBXs. Calls can be handled according to a single set of rules or multiple sets of rules. Calls can be forwarded along with an indication as to the original VPBX for the call in order to facilitate VPBX-specific call handling.

The use of feature server modules to form a VPBX facilitates management of the VPBX. Telephone extensions can be easily added to the VPBX and removed from the VPBX by merely reconfiguring one or more feature server modules as appropriate. For example, a new telephone extension can be added by simply installing a feature server module to the network and reconfiguring one or more of the existing VPBX feature server modules to forward calls to the added feature server modules. Similarly, a telephone extension can be removed by simply reconfiguring one or more other feature server modules to stop forwarding calls to that feature server module (even if that feature server module remains connected to the network). Also, feature server modules can be moved within the VPBX (e.g., from one office or room to another) with little or no reconfiguration required, as the underlying internet telephony protocols typically identify and locate devices on the network automatically.

It should be noted that, while exemplary embodiments are described above with reference to the Session Initiated Protocol (SIP), the present invention is in no way limited to SIP or to any particular protocol. Other internet telephony protocols (including existing and later developed peer-to-peer (P2P) protocols) could be employed in various alternative embodiments of the present invention.

It should also be noted that terms such as "router" and "server" are used herein to describe various communication devices that may be used in a communication system, and should not be construed to limit the present invention to any particular communication device type. Thus, a communication device may include, without limitation, a bridge, router, bridge-router (brouter), switch, node, server, computer, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the feature server logic is implemented as a set of computer program instructions that is converted into a computer executable form, stored as such in a computer readable medium, and executed by a microprocessor within the feature server module under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. An internet telephony system comprising a plurality of feature server modules operably coupled to form at least one virtual private branch exchange, wherein each feature server module includes an integral internet telephony feature server that is configured and operates independently of the other feature server modules for at least one of receiving and forwarding internet telephone calls.

2. An internet telephony system according to claim 1, wherein at least one virtual private branch exchange includes a plurality of feature server modules logically interconnected in a hierarchy having at least two tiers.

3. An internet telephony system according to claim 2, wherein telephone calls are forwarded strictly according to the hierarchy.

4. An internet telephony system according to claim 2, wherein telephone calls are permitted to be forwarded among peer feature server modules at a particular tier of the hierarchy.

5. An internet telephony system according to claim 2, wherein the hierarchy includes a main feature server module and at least one subordinate feature server module.

6. An internet telephony system according to claim 5, further comprising at least one intermediate feature server module operating between the main feature server module and the at least one subordinate feature server module.

7. An internet telephony system according to claim 5, wherein the main feature server module is configurable to direct telephone calls to the at least one subordinate feature server module, and wherein each subordinate feature server module is separately configurable to handle telephone calls forwarded to it by the main feature server module.

8. An internet telephony system according to claim 1, wherein the plurality of feature server modules are logically divided into a plurality of virtual private branch exchanges, and wherein at least one feature server module is operably coupled for operation in the plurality of virtual private branch exchanges.

9. An internet telephony system according to claim 8, wherein each virtual private branch exchange includes a main feature server module and at least one subordinate feature server module, and wherein the main feature server modules are configured to forward calls to the at least one feature server module operably coupled for operation in the plurality of virtual private branch exchanges.

10. An internet telephony system according to claim 8, wherein each virtual private branch exchange includes a main feature server module and at least one subordinate feature server module, and wherein at least one subordinate feature server module in one virtual private branch exchange is configured to forward calls to a feature server module in another virtual private branch exchange.

11. An internet telephony system according to claim 8, wherein the at least one feature server module operably coupled for operation in the plurality of virtual private branch exchanges includes a distinct set of rules for handling calls originating from each virtual private branch exchange.

12. An internet telephony system according to claim 9, wherein the at least one feature server module operably coupled for operation in the plurality of virtual private branch exchanges includes a distinct set of rules for handling calls originating from different virtual private branch exchanges, and wherein the main feature server modules forward telephone calls along with an indication of the originating virtual private branch exchange.

13. An internet telephony system according to claim 12, wherein each subsequent feature server module forwards the telephone call along with the indication.

14. An internet telephony apparatus comprising:
a network interface for receiving internet telephone calls originating from a plurality of virtual private branch exchanges;
a memory for storing rules for handling the internet telephone calls, the memory including storage for a distinct set of rules for each virtual private branch exchange; and
a feature server operably coupled to the network interface and the memory for handling each internet telephone call according to the set of rules associated with the originating virtual private branch exchange.

15. An internet telephony apparatus according to claim 14, wherein the telephone calls are received along with an indication of the originating virtual private branch exchange, and wherein the feature server retrieves the set of rules associated with the originating virtual private branch exchange from the memory based on the indication.

16. An internet telephony apparatus according to claim 14, wherein the feature server includes a web interface through which the sets of rules can be configured.

17. An internet telephony apparatus according to claim 14, further comprising a telephone interface into which a standard analog telephone can be connected.

18. An internet telephony apparatus according to claim 14, further comprising at least one of a microphone and a speaker.

19. A method for handling internet telephone calls originating from a plurality of virtual private branch exchanges, the method comprising:
maintaining a plurality of rule sets, each rule set associated with a different virtual private branch exchange;
receiving an internet telephone call;
determining an originating virtual private branch exchange for the telephone call; and
processing the telephone call according to the rule set associated with the originating virtual private branch exchange.

20. A method according to claim 19, wherein the telephone call is received along with an indication of the originating virtual private branch exchange, and wherein the originating virtual private branch exchange is determined by the indication.

* * * * *